United States Patent
Ukawa et al.

(10) Patent No.: US 8,712,221 B2
(45) Date of Patent: Apr. 29, 2014

(54) VIDEO RECORDING AND PLAYING APPARATUS AND ITS CONTROL METHOD

(75) Inventors: Satoshi Ukawa, Komae (JP); Tomoyuki Ohno, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 12/697,493

(22) Filed: Feb. 1, 2010

(65) Prior Publication Data

US 2010/0202763 A1 Aug. 12, 2010

(30) Foreign Application Priority Data

Feb. 12, 2009 (JP) ................................. 2009-030014

(51) Int. Cl.
*G11B 27/00* (2006.01)

(52) U.S. Cl.
USPC .......................................................... 386/278

(58) Field of Classification Search
None
See application file for complete search history.

(56) References Cited

U.S. PATENT DOCUMENTS

| | | | | |
|---|---|---|---|---|
| 6,310,839 B1 * | 10/2001 | Lee et al. | .................. | 369/30.07 |
| 6,760,635 B1 * | 7/2004 | Bates et al. | ..................... | 700/94 |
| 7,142,777 B1 | 11/2006 | Ohno | | |
| 7,197,231 B2 | 3/2007 | Hoshi et al. | | |
| 7,260,828 B2 | 8/2007 | Aratani et al. | | |
| 7,599,960 B2 | 10/2009 | Yamamoto et al. | | |
| 7,607,109 B2 | 10/2009 | Ohno et al. | | |
| 7,620,910 B2 | 11/2009 | Ohno et al. | | |
| 2005/0091700 A1 | 4/2005 | Ohno et al. | | |
| 2005/0283557 A1 * | 12/2005 | Chen et al. | .................. | 369/30.07 |
| 2006/0285034 A1 | 12/2006 | Aratani et al. | | |
| 2008/0212421 A1 * | 9/2008 | Kitagawa et al. | .......... | 369/47.12 |
| 2008/0282292 A1 | 11/2008 | Ohno et al. | | |

FOREIGN PATENT DOCUMENTS

| | | | |
|---|---|---|---|
| JP | 09-070020 | | 3/1997 |
| JP | 2001-103404 | | 4/2001 |
| JP | 2001103404 | * | 4/2001 |
| JP | 2002-330390 | | 11/2002 |
| JP | 2002-354391 A | | 12/2002 |
| JP | 2004-349745 A | | 12/2004 |
| JP | 2006-157610 | | 6/2006 |
| JP | 2007-096368 A | | 4/2007 |
| JP | 2007-180861 | | 7/2007 |
| JP | 2008-204568 A | | 9/2008 |

* cited by examiner

*Primary Examiner* — William C Vaughn, Jr.
*Assistant Examiner* — Daniel Tekle
(74) *Attorney, Agent, or Firm* — Fitzpatrick, Cella, Harper & Scinto

(57) ABSTRACT

A video recording and playing apparatus for recording and playing a broadcast program. The apparatus comprises a recording unit to record broadcast programs on a storage unit, and a deletion unit to automatically delete a broadcast program recorded on the storage unit. The deletion unit determines, from among a plurality of broadcast programs recorded on the storage unit, a broadcast program which becomes a target of deletion, based on an audio signal or a rating of each broadcast program, in cases where a video recording capacity of the storage unit becomes smaller than a predetermined value.

3 Claims, 25 Drawing Sheets

| DISCRIMINATION ID | CHANNEL | PROGRAM NAME | BROADCAST START TIME | BROADCAST END TIME | |
|---|---|---|---|---|---|
| ID1 | Ch. X | PROGRAM A | Tcs1 | Tce1 | — T001 |
| ID2 | Ch. Y | PROGRAM B | Tcs2 | Tce2 | — T002 |
| ID3 | Ch. Z | PROGRAM C | Tcs1 | Tce1 | — T003 |
| ID4 | Ch. P | PROGRAM D | Tcs2 | Tce2 | — T004 |
| ID5 | Ch. X | PROGRAM E | Tcs3 | Tce3 | — T005 |
| ID6 | Ch. Y | PROGRAM F | Tcs4 | Tce4 | — T006 |

IN CASE OF NON AUTOMATIC DELETION

IN CASE OF AUTOMATIC DELETION

IN CASE OF NON AUTOMATIC DELETION

IN CASE OF AUTOMATIC DELETION

FIG. 12

| GENRE | PARAMETER USED FOR DETERMINATION OF BROADCAST PROGRAM TO BE MADE TARGET OF DELETION |
|---|---|
| DRAMA | RATING |
| VARIETY | AUDIO SIGNAL |
| SPORT | AUDIO SIGNAL |

FIG. 13
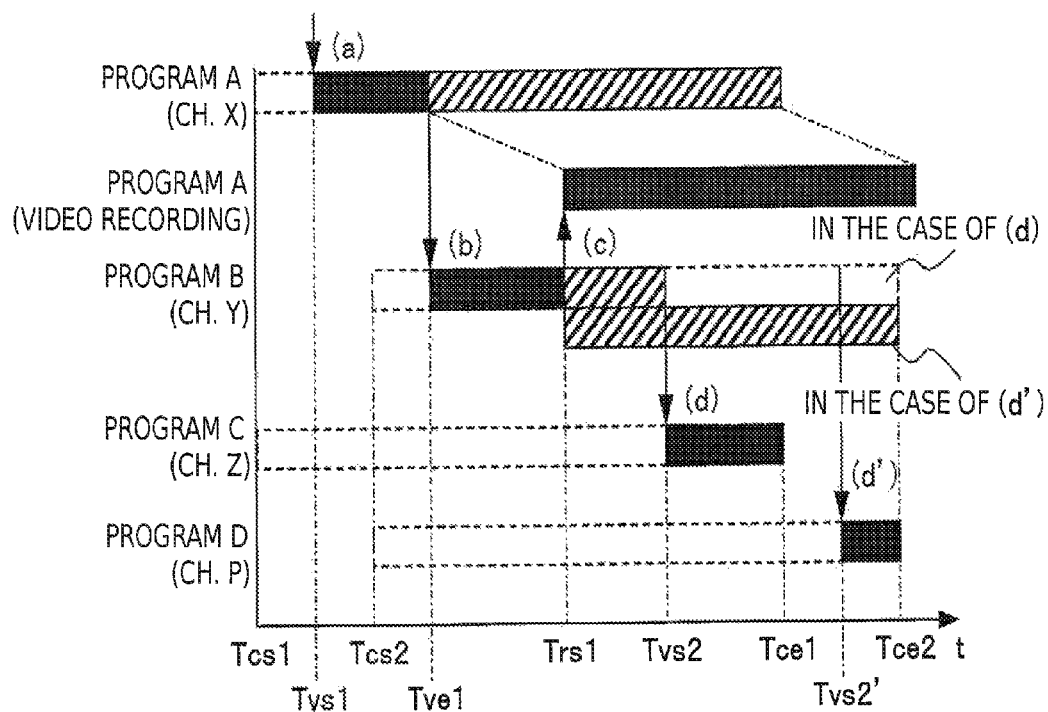
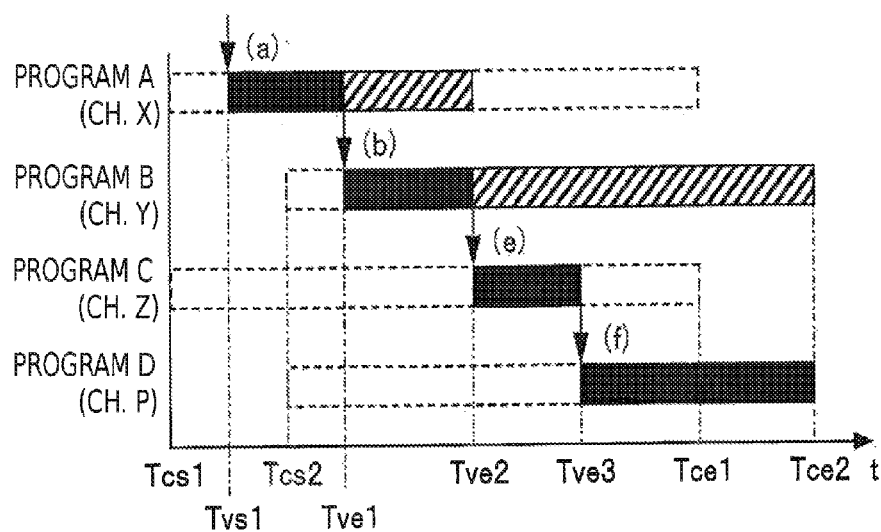

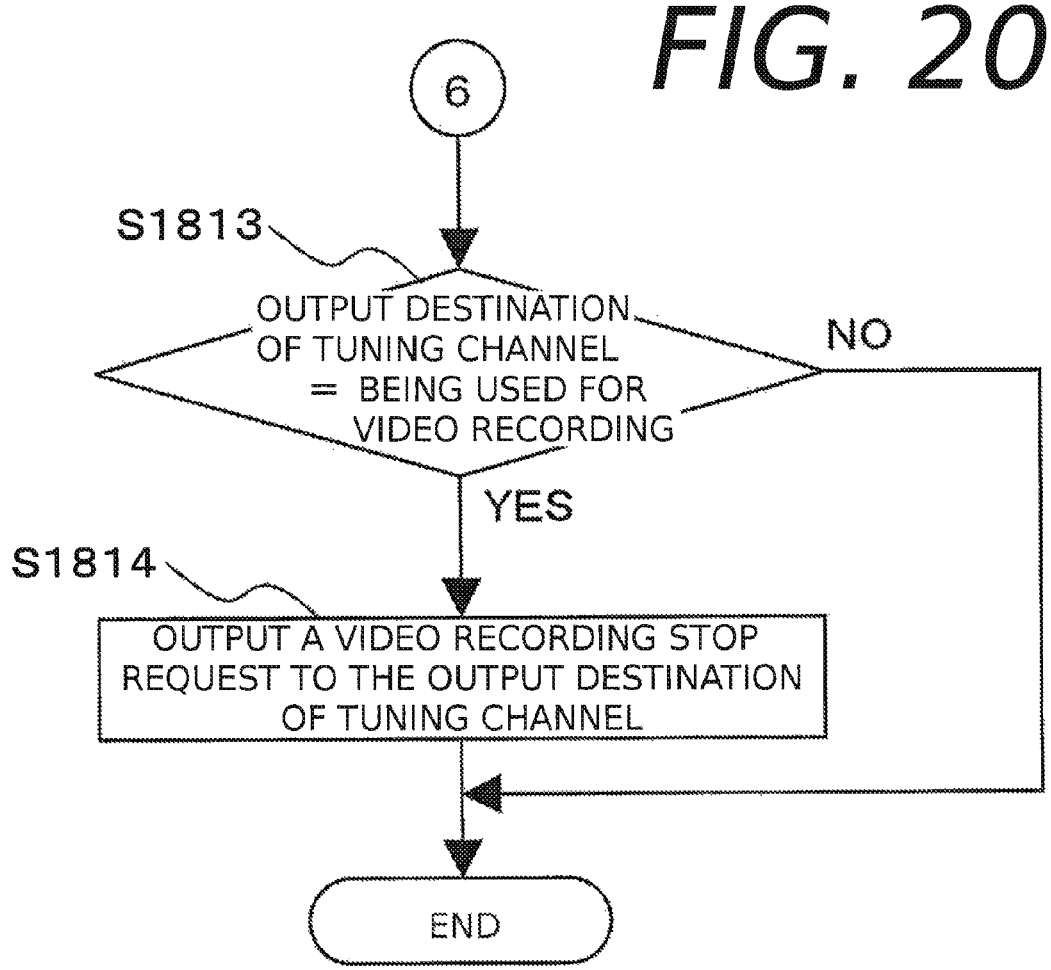

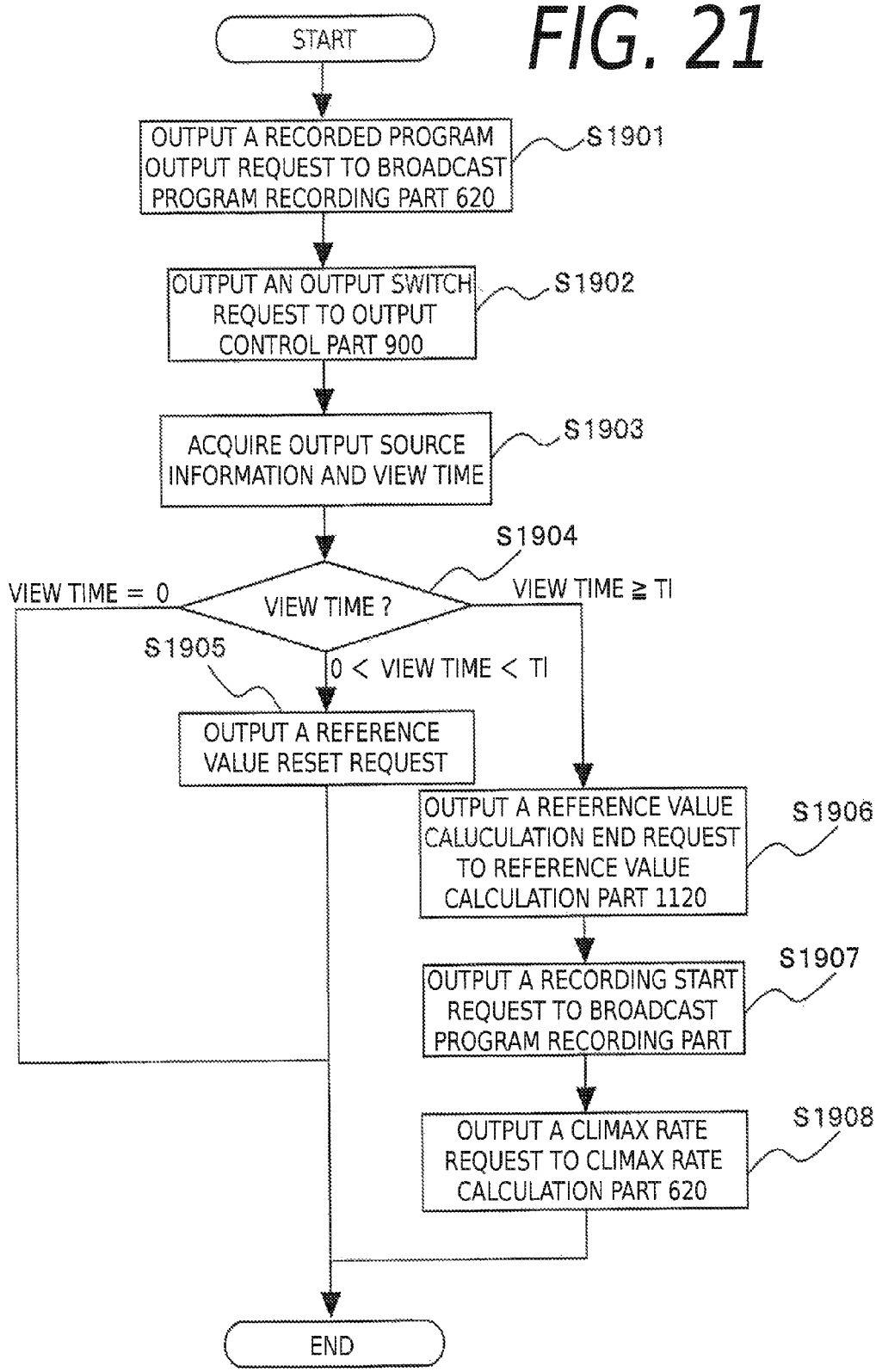

IN CASE OF NON AUTOMATIC DELETION

IN CASE OF AUTOMATIC DELETION

VIDEO RECORDING AND PLAYING APPARATUS AND ITS CONTROL METHOD

BACKGROUND OF THE INVENTION

1. Field of the Invention

The present invention relates to a video recording and playing apparatus which records and plays a broadcast program, and it also relates to its control method.

2. Description of the Related Art

In recent years, there have been known apparatuses (automatic video recording apparatuses) for automatically restringing broadcast programs based on a search condition, historical information or the like beforehand set by a user. In addition, there is an apparatus which has a function to automatically delete a recorded program in cases where a recording region (an available or free space of a storage device in which recorded programs are accumulated) becomes short.

For example, in Japanese Patent Application Laid-Open No. H09-070020, there is disclosed an apparatus that deletes recorded programs according to their priority in an automatic manner in cases where a recording region becomes short. In the apparatus disclosed in Japanese Patent Application Laid-Open No. H09-070020, the priorities of broadcast programs are calculated based on a genre-specific priority which is set for each genre of the broadcast programs, an individual program priority which is input by a user when the user makes a reservation of recording each broadcast program, and the time elapsed from the start or end of storage of the broadcast program.

In addition, there has been known a technique in which when a program which a user views and/or listens to (hereinafter simply referred to as "views") is changed, (i.e., when a channel (in which a program viewed by the user is broadcast) is changed by the user), the program which the user was viewing before the channel change is automatically recorded.

For example, an apparatus disclosed in Japanese Patent Application Laid-Open No. 2007-180861 has a plurality of tuners which receive broadcast programs, respectively. Thus, when a user performs a channel change, in cases where the user has been viewing a broadcast program of a certain channel before the channel change for a specified length or more, the broadcast program of the channel is continuously cash recorded after the channel change.

In addition, there has been known a technique that serves to prevent a user from overlooking a climax or exciting scene in a broadcast program by detecting the climax or exciting scene of the broadcast program with the use of a change of the volume level or a change of the viewing rate of the broadcast program, and notifying it to the user.

SUMMARY OF THE INVENTION

However, with the conventional technique, it is necessary for a user to manually delete a recorded broadcast program depending on a remaining amount of the recording region, and hence there has been a possibility that the user may feel troublesomeness. In addition, there is also another possibility that a broadcast program having shown a climax or exciting to the extent that the user does not expect will be automatically deleted earlier than other recorded programs, and will become unable to be viewed.

For example, with the apparatus disclosed in Japanese Patent Application Laid-Open No. H09-070020, it is necessary for a user to set the priority of a broadcast program while estimating a climax thereof, so there is a possibility that a broadcast program which showed such a climax to the extent that the user does not expect may be deleted first.

In addition, since the apparatus disclosed in Japanese Patent Application Laid-Open No. 2007-180861 only records a broadcast program temporarily, there is a possibility that a broadcast program which showed such a climax to the extent that a user does not expect may be deleted during changing channel, thus making it impossible for the user to view the program.

Accordingly, the object of the present invention is to provide a video recording and playing apparatus and a control method therefor in which a recorded broadcast program without climax is automatically deleted and a recorded broadcast program which showed a climax is hard to be deleted.

A video recording and playing apparatus for recording and playing a broadcast program, according to the present invention, said apparatus comprising:

a recording unit to record broadcast programs on a storage unit; and a deletion unit to automatically delete a broadcast program recorded on said storage unit, wherein said deletion unit determines, from among a plurality of broadcast programs recorded on said storage unit, a broadcast program which becomes a target of deletion, based on an audio signal or a rating of each broadcast program, in cases where a video recording capacity of said storage unit becomes smaller than a predetermined value.

A control method for a video recording and playing apparatus which records and plays a broadcast program, according to the present invention, said method comprising the steps of:

recording broadcast programs on a storage unit; and automatically deleting a broadcast program recorded on said storage unit, wherein in said step of automatically deleting a broadcast program, in cases where a video recording capacity of said storage unit becomes smaller than a predetermined value, a broadcast program which becomes a target of deletion is determined based on an audio signal or a rating of each broadcast program, from among a plurality of broadcast programs recorded on said storage unit.

According to the present invention, it is possible to provide a video recording and playing apparatus and a control method therefor in which a recorded broadcast program without a climax is automatically deleted and a recorded broadcast program which showed a climax is hard to be deleted.

Further features of the present invention will become apparent from the following description of exemplary embodiments with reference to the attached drawings.

BRIEF DESCRIPTION OF THE DRAWINGS

FIG. 2 is a block diagram showing the internal configuration of the video recording and playing apparatus according to the first example.

FIG. 4 shows an example of program information which is stored in a program information management part.

FIG. 12 is a view showing an example of a method for determining an object to be deleted.

FIG. 13 is a view showing examples of a view period and a recording period of a broadcast program.

FIG. 20 is a flow chart showing an operation of the tuning control part according to the third example at the time of receiving the tuning request.

FIG. 21 is a flow chart showing an operation of a video recording and playback control part according to the third example at the time of receiving a playback request.

DESCRIPTION OF THE EMBODIMENTS

Hereinafter, reference will be made to specific examples of a video recording and playing apparatus according to an embodiment of the present invention. The video recording and playing apparatus according to this embodiment is to record and play broadcast programs, and has a function of recording a broadcast program on a storage unit, and a function of deleting recorded broadcast programs in an automatic manner.

FIRST EXAMPLE

First, a video recording and playing apparatus according to a first example of the present invention will be described. The video recording and playing apparatus according to this example determines a broadcast program(s) to be deleted (which becomes a target of deletion) from a plurality of recorded broadcast programs based on audio signals of the broadcast programs.

Figure 1:
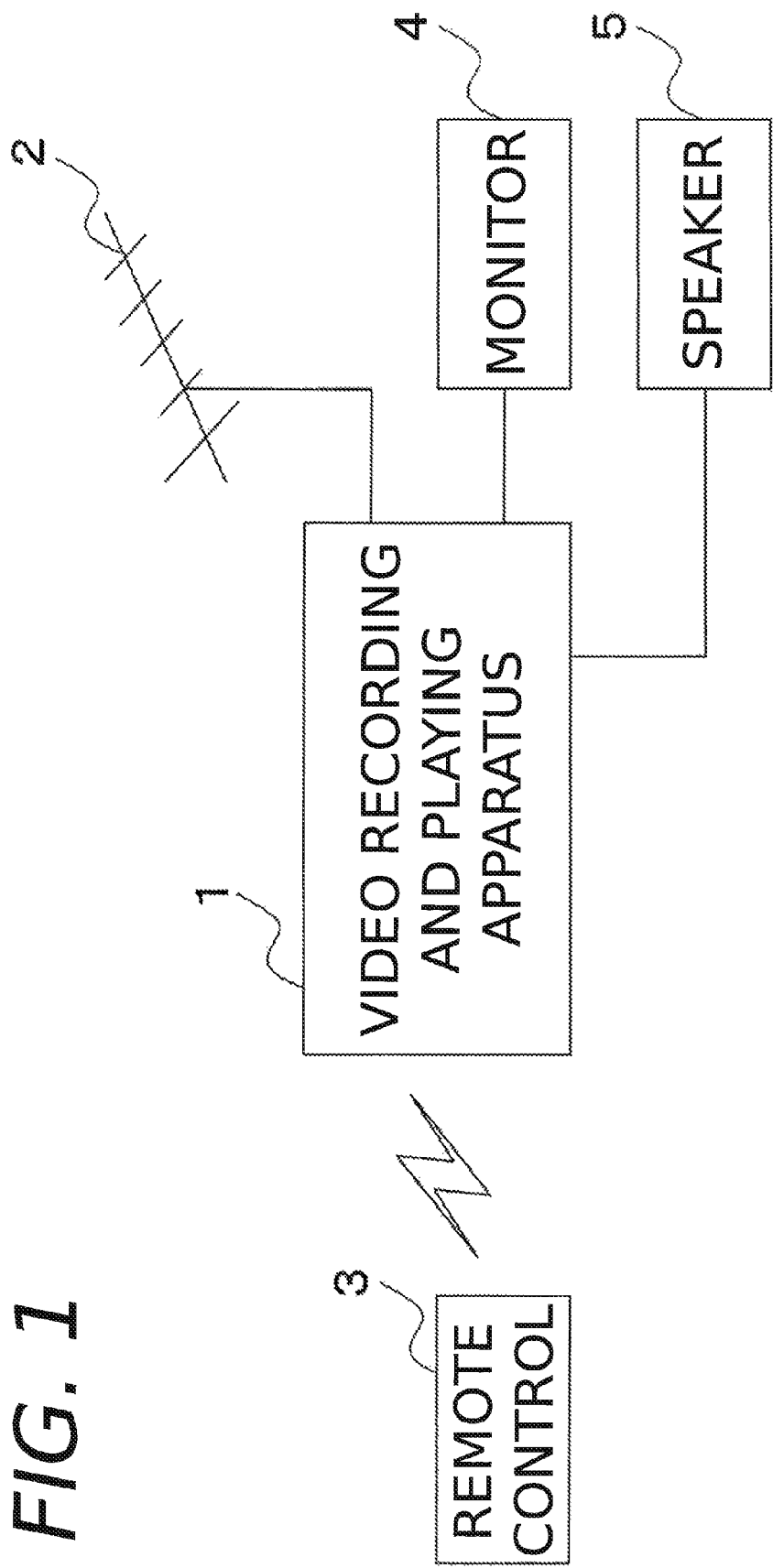
FIG. 1 is a view showing an example of connection between a video recording and playing apparatus and external equipment according to a first example.

FIG. 1 is a view showing an example of connection between a video recording and playing apparatus according to the first example of the present invention and external equipment. In the example of FIG. 1, the video recording and playing apparatus, denoted at 1, is connected to an antenna 2 so that it receives broadcast waves from broadcasting stations which are not illustrated. A user makes (transmits) a request for the automatic video recording of a broadcast program, or the playback of a recorded broadcast program from the video recording and playing apparatus 1 by the use of a remote control 3. A video signal of the broadcast program is outputted to a monitor 4, so that a video is displayed on the monitor 4. An audio signal of the broadcast program is outputted to a speaker 5, so that a sound is outputted from the speaker 5.

Figure 2:
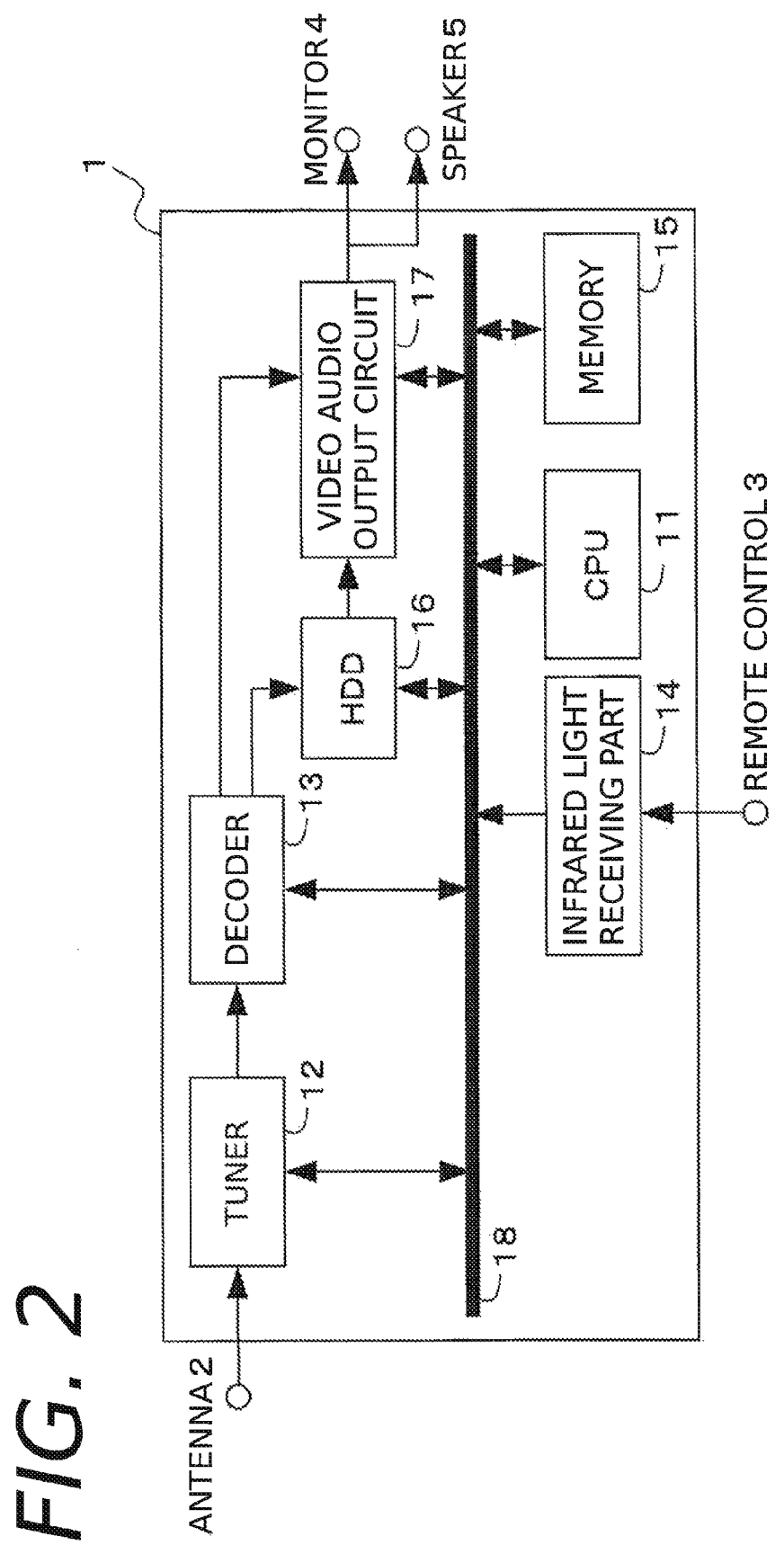

FIG. 2 is a block diagram showing the internal configuration of the video recording and playing apparatus according 1 depicted in FIG. 1.

A CPU 11 controls the individual configuration blocks of the video recording and playing apparatus 1. Specifically, the CPU 11 controls the individual configuration blocks through an internal bus 18 based on the internal state of the video recording and playing apparatus 1 and the operation information received from an infrared light receiving part 14. In addition, the CPU 11 calculates the rate or degree of climax of a broadcast program based on an audio signal of the broadcast program outputted from a decoder 13, and determines based on the calculated result whether the broadcast program should be automatically deleted. In cases where it is determined that the broadcast program should be automatically deleted, the broadcast program recorded on a HDD 16 is deleted. Here, note that the rate of climax is a value indicating the rate of climax or exciting of a broadcast program.

A tuner 12 performs the processing of picking up a broadcast signal (broadcast program) from the broadcast waves received by the antenna 2. Specifically, the tuner 12 tunes in a specific frequency according to an instruction from the CPU 11. Then, the tuner 12 extracts a broadcast signal contained in the specific frequency and outputs it to the decoder 13. As the tuner 12, there can be applied, for example, tuners used in general digital television, such as those for digital terrestrial broadcasting, those for BS/wideband CS digital broadcasting, and so on.

The decoder 13 analyzes the broadcast signal picked up by the tuner 12, and separates it into a video signal, an audio signal and a data signal, and decodes the coded video signal and the coded audio signal thus separated. The decoder 13 outputs the video signal and the audio signal thus decoded to a video audio output circuit 17, and records in a memory 15 program information such as a program name, a broadcast start time, etc., included in the data signal. In addition, the decoder 13 outputs the coded video signal and the coded audio signal to the HDD 16. The audio signal is also outputted to the CPU 11 in order to calculate the rate of climax.

The infrared light receiving part 14 receives an infrared light signal transmitted from the remote control 3 at the time when the user operates the remote control 3, and transmits information (i.e., operation information) indicative of such an operation to the CPU 11. Here, note that in this example, reference is made to a case in which operation information is transmitted via infrared light from the remote control 3, but operation information may be transmitted by means of other wireless techniques (Bluetooth (trademark), wireless LAN according to IEEE 802.11, etc.).

The memory 15 temporarily saves data created by the CPU 11 and other respective configuration blocks. As the memory 15, there can be applied, for example, an SRAM (Static Random Access Memory) or a DRAM (Dynamic Random Access Memory), which is able to retain data only during the time when electric power is supplied to the video recording and playing apparatus 1. In addition, there can also be applied a flash memory or an EEPROM (Electronically Erasable Programmable Read Only Memory) memory, which is able to continue holding recorded data even in a state where the supply of electric power is stopped.

The HDD 16 records the video signal and the audio signal outputted by the decoder 13. Although a hard disk drive can be considered to be used as the HDD 16, the HDD 16 is not limited to this but any storage medium may be used which has a capacity enough to be able to record the video signal and the audio signal.

The video audio output circuit 17 receives the video signal outputted from the decoder 13 or the HDD 16, and outputs it to the monitor 4 after converting the video signal into a format suitable for the monitor 4. In addition, the video audio output circuit 17 receives the audio signal outputted from the decoder 13 or the HDD 16, and outputs it to the speaker 5 after converting the audio signal into a format suitable for the speaker 5.

The internal bus 18 is used for transmission and reception of data among the individual configuration blocks in the video recording and playing apparatus 1.

Figure 3:
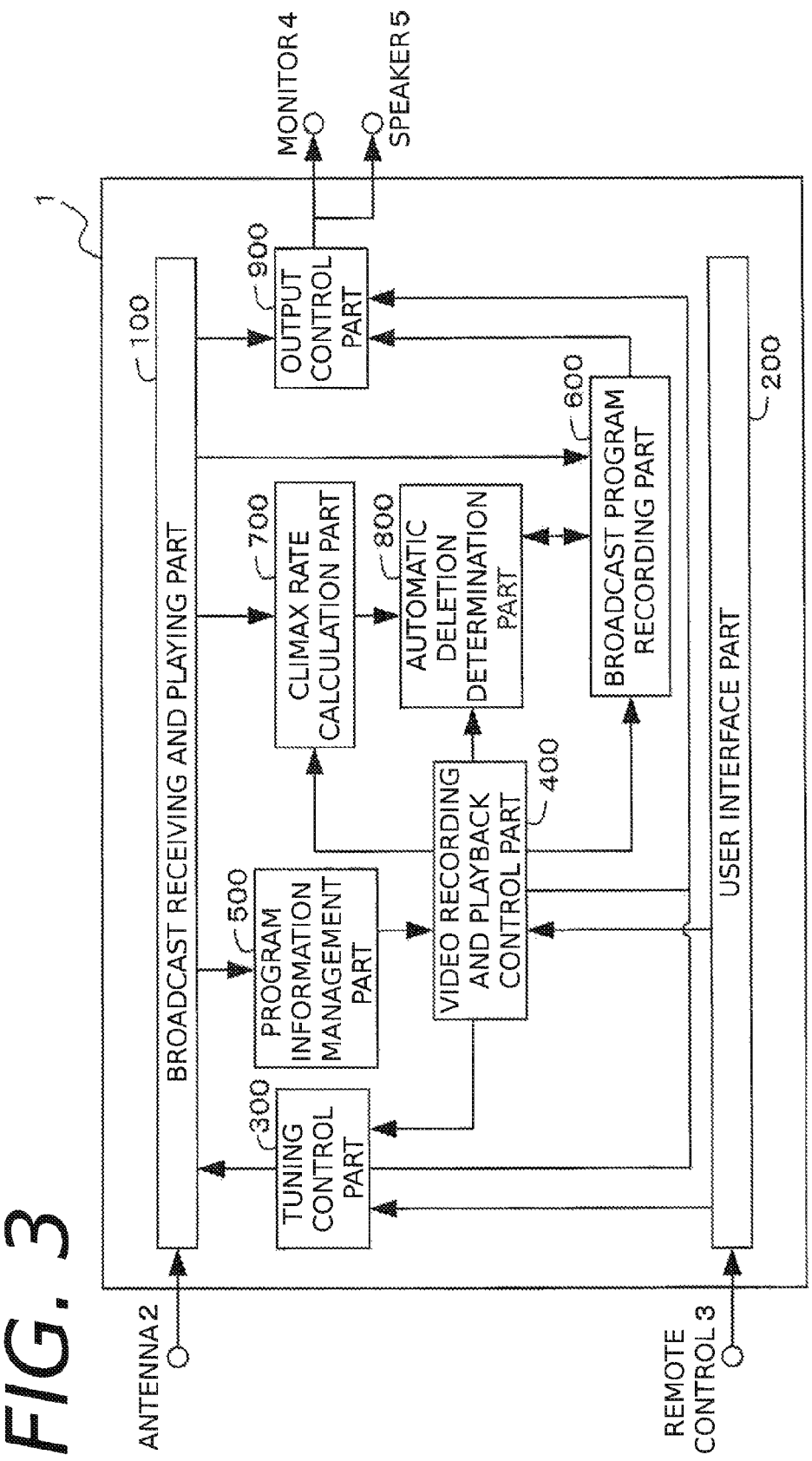
FIG. 3 is a functional block diagram of the video recording and playing apparatus according to the first example.

FIG. 3 is a functional block diagram of the video recording and playing apparatus 1 as depicted in FIGS. 1 and 2.

A broadcast receiving and playing part 100 tunes in a channel instructed from a tuning control part 300, and picks up multiplexed program data (broadcast signal) from the broadcast waves received by the antenna 2. Then, the multiplexed program data is separated into a video signal, an audio signal, and a data signal. In this example, it is assumed that the video signal, the audio signal and so on are multiplexed by an MPEG2 (Moving Picture Experts Group 2: Second Standard of Color Moving Picture Image Coding Standardization Group) transport stream (TS) system. Because the separated video signal and the separated audio signal are compressed and encoded by the MPEG2 system, the broadcast receiving and playing part 100 decodes these individual signals, and outputs them to an output control part 900. The broadcast receiving and playing part 100 extracts program information from the separated data signal, and outputs it to a program information management part 500. The program information includes a discrimination ID of a broadcast program (broadcast content), a broadcast channel, a program title, a broadcast start time, a broadcast time or length, etc., and is used for reservation of video recording (automatic video recording), calculation of the rate of climax, etc. In addition, the broadcast receiving and playing part 100 outputs the separated video signal and the separated audio signal in their compression coded state to a broadcast program recording part 600.

Also, the broadcast receiving and playing part 100 outputs the decoded audio signal to a climax rate calculation part 700.

A user interface part 200 receives an instruction of "channel up", "Ch. X selection (X is a channel number)", etc., from the user, and outputs a tuning request to the tuning control part 300 so as to tune in a channel according to the instruction. In addition, the user interface part 200 receives an instruction such as "an input of a condition (automatic video recording condition) for automatic video recording", "playback of a recorded program", etc., from the user, and outputs a video recording reservation request, a playback request, etc., to a video recording and playback control part 400 in order to cause an operation according to the instruction to be performed. Here, note that an instruction from the user is usually made through the remote control, and can be accompanied by an operation screen including choices, such as "Yes" and "No".

The tuning control part 300 outputs a tuning channel (a frequency according to a tuning request) to the broadcast receiving and playing part 100 in accordance with the tuning request received from the user interface part 200 or the video recording and playback control part 400. At that time, the tuning control part 300 outputs an output switch request to the output control part 900 so that the video signal and the audio signal outputted from the broadcast receiving and playing part 100 are supplied to the monitor 4 and the speaker 5, respectively.

Upon reception of the video recording reservation request from the user interface part 200, the video recording and playback control part 400 determines a broadcast program to be reserved for video recording based on the automatic video recording condition and the program information which is periodically acquired from the program information management part 500. When the current time reaches the broadcast start time of the broadcast program for which the reservation of video recording has been made, the video recording and playback control part 400 outputs a tuning request to the tuning control part 300, and a recording start request to the broadcast program recording part 600 so as to record the broadcast program. Then, the video recording and playback control part 400 outputs a climax rate calculation request for calculating the rate of climax of the broadcast program to the climax rate calculation part 700. When the video recording of the broadcast program is finished, such as in cases where the broadcast of the broadcast program is completed, the video recording and playback control part 400 outputs a video recording end request to the broadcast program recording part 600, a climax rate calculation end request to the climax rate calculation part 700, and an automatic deletion determination request to an automatic deletion determination part 800, respectively. In addition, upon reception of a playback request from the user interface part 200, the video recording and playback control part 400 outputs a recorded program output request for outputting a recorded broadcast program to the broadcast program recording part 600 in accordance with the playback request. At that time, the video recording and playback control part 400 outputs an output switch request to the output control part 900 so that the video signal and the audio signal outputted from the broadcast program recording part 600 are supplied to the monitor 4 and the speaker 5, respectively. Here, note that each of the recording start request, the recording end request, the climax rate calculation request, the climax rate calculation end request, and the automatic deletion determination request includes program information for identifying a target broadcast program.

The program information management part 500 stores program information with respect to broadcast programs and broadcast scheduled programs. Such program information is periodically acquired and updated by the broadcast receiving and playing part 100. In addition, the program information management part 500 outputs the program information according to a request from the video recording and playback control part 400.

According to the recording start request received from the video recording and playback control part 400, the broadcast program recording part 600 records the video signal and the audio signal outputted by the broadcast receiving and playing part 100 while associating these signals with the program information, and ends the recording of the video signal and the audio signal according to the recording end request received from the video recording and playback control part 400. In addition, according to the recorded program output request received from the video recording and playback control part 400, the broadcast program recording part 600 decodes the video signal and the audio signal of the recorded broadcast program, respectively, and outputs them to the output control part 900. The broadcast program recording part 600 deletes a recorded broadcast program according to a deletion request received from the automatic deletion determination part 800.

The climax rate calculation part 700 calculates the rate of climax of the broadcast program based on the audio signal acquired from the broadcast receiving and playing part 100 in accordance with the climax rate calculation request received from the video recording and playback control part 400, and ends the calculation of the rate of climax in accordance with the climax rate calculation end request received from the video recording and playback control part 400. Here, note that in this example, a maximum value of the volume level in a broadcast program is assumed to be the rate of climax.

Upon reception of the automatic deletion determination request from the video recording and playback control part 400, the automatic deletion determination part 800 determines, based on the rate of climax of the broadcast program acquired from the climax rate calculation part 700, whether the recorded broadcast program is made a target of deletion. In cases where the broadcast program is made a target of deletion, a deletion request for deleting the broadcast program concerned is outputted to the broadcast program recording part 600.

The output control part 900 switches or changes the video signal outputted to the monitor 4 and the audio signal outputted to the speaker 5 according to an output switch request received from the tuning control part 300 or the video recording and playback control part 400.

FIG. 4 shows an example of program information which is stored in the program information management part 500.

In FIG. 4, T001 denotes that a broadcast program having a discrimination ID of "ID1", a channel of "Ch. X", and a program name of "program A" is broadcast from a time point of "Tcs1" to a time point of "Tce1". T002 denotes that a broadcast program having a discrimination ID of "ID2", a channel of "Ch. Y", and a program name of "program B" is broadcast from a time point of "Tcs2" to a time point of "Tce2". T003 denotes that a broadcast program having a discrimination ID of "ID3", a channel of "Ch. Z", and a program name of "program C" is broadcast from a time point of "Tcs1" to a time point of "Tce1". T004 denotes that a broadcast program having a discrimination ID of "ID4", a channel of "Ch. P", and a program name of "program D" is broadcast from a time point of "Tcs2" to a time point of "Tce2". T005 denotes that a broadcast program having a discrimination ID of "ID5", a channel of "Ch. X", and a program name of "program E" is broadcast from a time point of "Tcs3" to a time point of "Tce3". T006 denotes that a broadcast program having a discrimination ID of "ID6", a channel of "Ch. Y", and a program name of "program F" is broadcast from a time point of "Tcs4" to a time point of "Tce4".

Figure 5A:
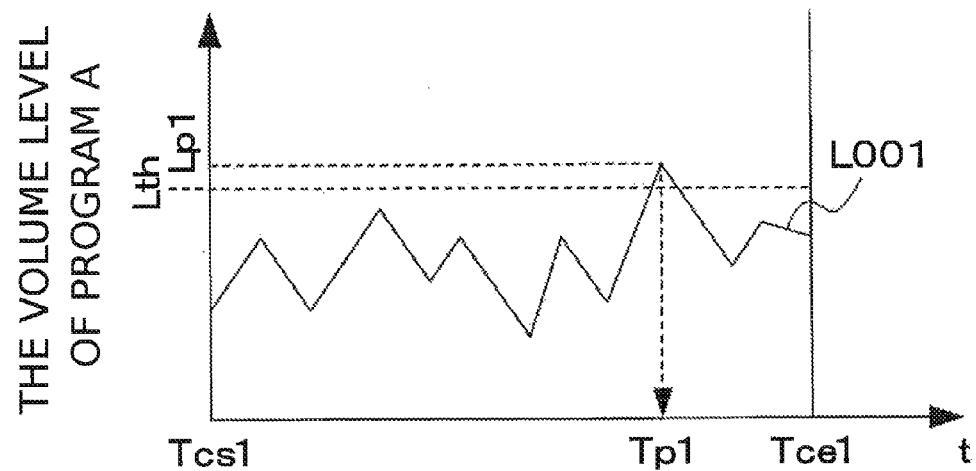
FIG. 5A and FIG. 5B show examples of the change of the volume level from the start of broadcasting a program to the end thereof, wherein the axis of ordinate represents time and the axis of abscissa represents the volume level.
Figure 5B:
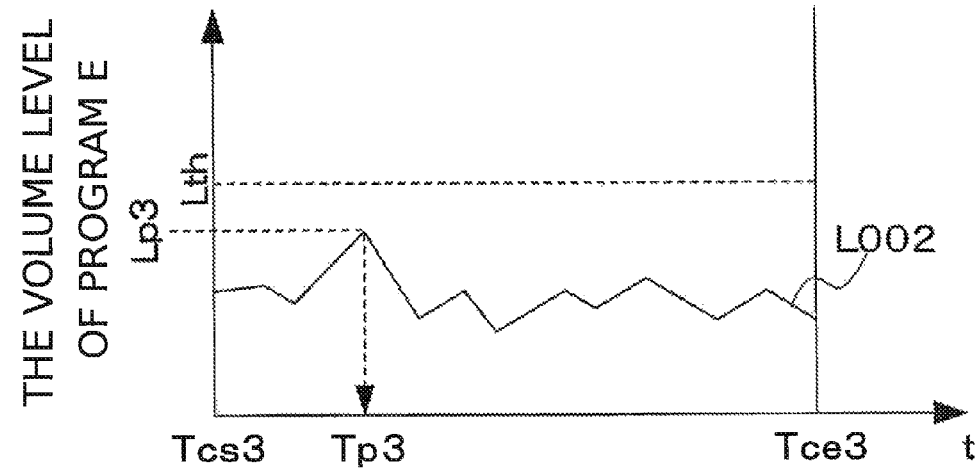

FIG. 5A and FIG. 5B show examples of the change of the volume level from the start of broadcasting a program to the end thereof, wherein the axis of ordinate represents time and the axis of abscissa represents the volume level. In addition, a value "Lth" of the volume level is a threshold for determining whether there is any climax. Here, note that the threshold "Lth" is assumed to be beforehand set in the video recording and playing apparatus 1. The volume level of "program A" changes as shown by L001, and becomes a maximum value of "Lp1" at a time point of "Tp1" (FIG. 5A). The maximum value "Lp1" is larger than the threshold "Lth". On the other hand, the volume level of "program E" changes as shown by L002, and becomes a maximum value of "Lp3" at a time point of "Tp3" (FIG. 5B). The maximum value "Lp3" is smaller than the threshold "Lth". In this example, in cases where the maximum value of the volume level is larger than "Lth", it is determined that there is a climax in the broadcast program, and in cases where the maximum value of the volume level is equal to or less than "Lth", it is determined that there is no climax in the broadcast program.

Figure 6:
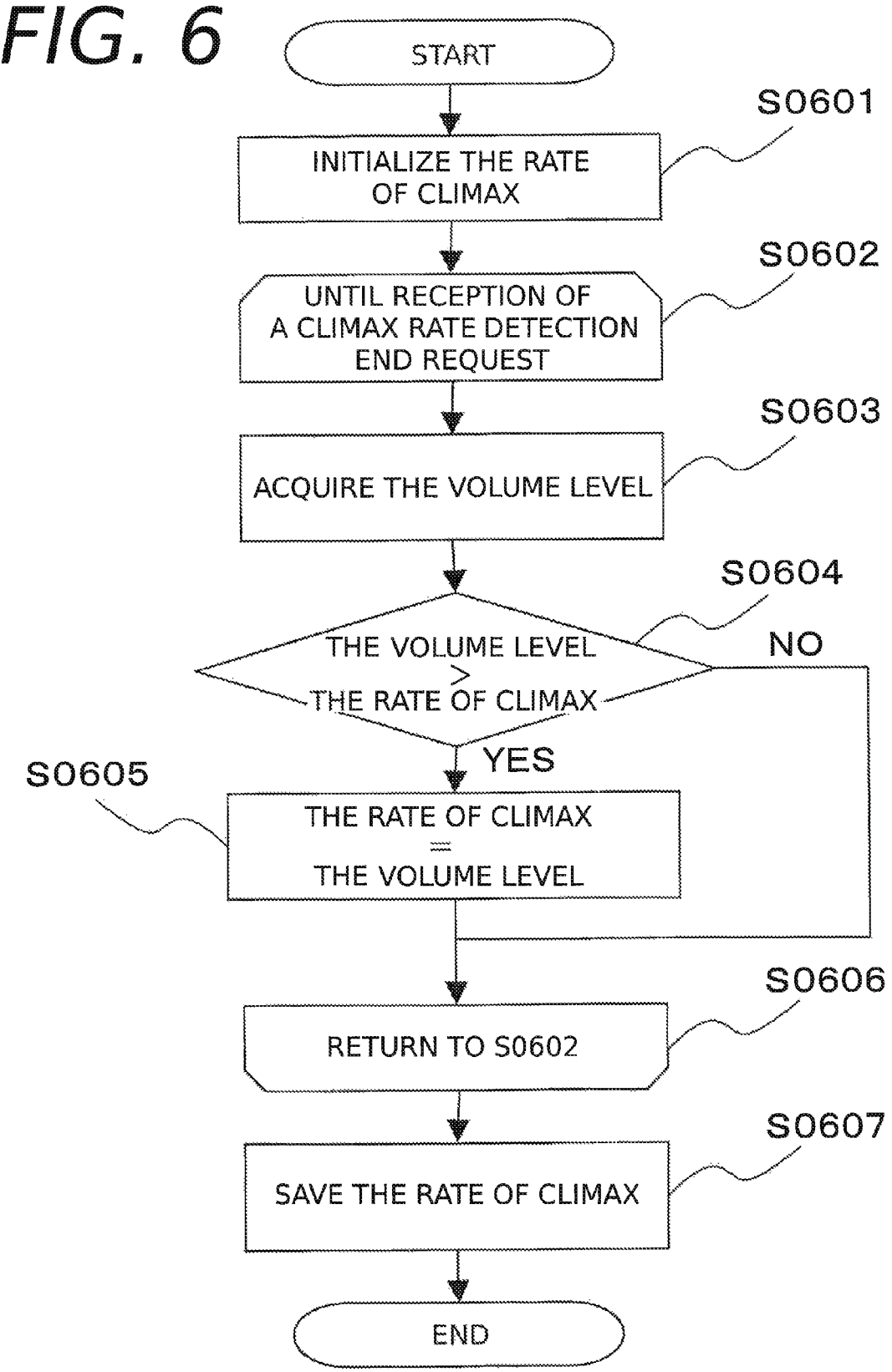
FIG. 6 is a flow chart showing an operation of a climax rate calculation part according to the first example at the time of receiving a climax rate calculation request.

FIG. 6 is a flow chart showing the operation of the climax rate calculation part 700 at the time of receiving a climax rate calculation request from the video recording and playback control part 400.

Upon reception of a climax rate calculation request for a broadcast program from the video recording and playback control part 400, the climax rate calculation part 700 initializes the rate of climax with respect to the broadcast program (S0601). Specifically, the rate of climax is made to zero. Thereafter, processings from S0603 to S0606 are repeated until when the climax rate calculation part 700 receives a climax rate calculation end request (S0602).

First, the volume level is acquired from an audio signal acquired from the broadcast receiving and playing part 100 (S0603). Then, it is checked whether the volume level thus acquired is larger than the rate of climax (S0604). In cases where the acquired volume level is larger than the rate of climax (S0604: YES), the acquired volume level is set to the rate of climax (S0605), whereas in cases where the acquired volume level is equal to or less than the rate of climax (S0604: NO), the rate of climax is not updated.

Then, a return is made to S0602 (S0606). The processings from S0603 to S0606 are repeated until when a climax rate calculation end request is received, as mentioned above.

When a climax rate calculation end request is received, the program information contained in the climax rate calculation request and the rate of climax are saved while being associated with each other (S0607). When the above-mentioned processing is performed in the case of FIG. 5A, the rate of climax becomes Lp1, whereas when the above-mentioned processing is performed in the case of FIG. 5B, the rate of climax becomes Lp3.

Figure 7:
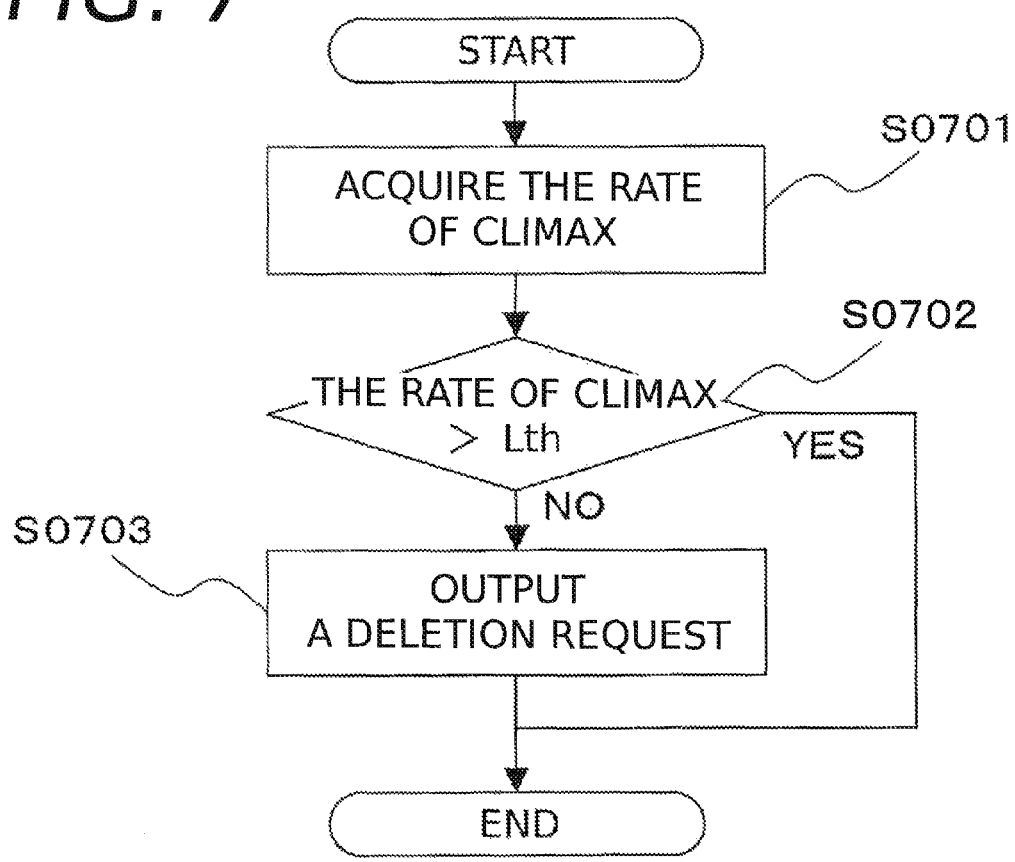
FIG. 7 is a flow chart showing an operation of an automatic deletion determination part according to the first example at the time of receiving an automatic deletion determination request.

FIG. 7 is a flow chart showing the operation of the automatic deletion determination part 800 at the time of receiving an automatic deletion determination request from the video recording and playback control part 400. Here, note that automatic deletion determination processing will be described in the cases of FIG. 5A and FIG. 5B.

When an automatic deletion determination request for a broadcast program is received from the video recording and playback control part 400, the automatic deletion determination part 800 acquires the rate of climax of the broadcast program from the climax rate calculation part 700 (S0701), and determines whether the rate of climax is larger than the threshold "Lth" (S0702). In the case of FIG. 5A, the rate of climax "Lp1" is larger than the threshold "Lth", so the result of the determination corresponds to "YES" in S0702, and the automatic deletion determination processing is ended. On the other hand, in the case of FIG. 5B, the rate of climax "Lp3" is equal to or less than the threshold "Lth", so the result of the determination corresponds to "NO" in S0702, and a deletion request for "program E" is outputted to the broadcast program recording part 600 (S0703).

Thus, in this example, when a broadcast program matching with a condition which has been inputted by a user is automatically recorded, the rate of climax of the broadcast program is calculated based on the audio signal of the broadcast program. Then, in cases where the rate of climax is less than the threshold, the broadcast program concerned is deleted in an automatic manner. By so doing, it is possible to eliminate the troublesomeness of manually deleting the broadcast program which did not show such a rate of climax as expected by the user. In addition, because among a plurality of broadcast programs automatically recorded, those which showed a climax are saved, it is possible to decrease the possibility that the user overlooks the broadcast programs having showed a climax.

Here, note that in this example, the configuration of FIG. 2 has been adopted in order to achieve the individual functions in FIG. 3. Specifically, the broadcast receiving and playing part 100 corresponds to the tuner and the decoder 13. The user interface part 200 corresponds to the infrared light receiving part 14. The program information management part 500 corresponds to the memory 15. The broadcast program recording part 600 corresponds to the HDD 16. The output control part 900 corresponds to the video audio output circuit 17. The tuning control part 300, the video recording and playback control part 400, the climax rate calculation part 700, and the automatic deletion determination part 800 correspond to the CPU 11. However, the configuration of the video recording and playing apparatus according to this example is not limited to that of FIG. 2. For example, the tuning control part 300, the video recording and playback control part 400, the climax rate calculation part 700, and the automatic deletion determination part 800 may be composed of separate and individual control circuits, respectively.

Although in this example, reference has been made to the case in which the threshold for the volume level was beforehand set in the video recording and playing apparatus 1, the threshold may be able to be suitably set by the user.

In addition, although in this example, a recorded broadcast program of which the maximum value of the volume level is equal to or less than the threshold is determined as a broadcast program without a climax and is set as a target of deletion, a broadcast program in which an average value of the volume level is equal to or less than the threshold can be determined as a target of deletion.

Moreover, although in this example, a determination as to whether a recorded broadcast program is made a target of deletion is carried out based on the volume level of an audio signal of the program, it is not limited to this. Such a determination can be made in any way as long as the determination is made based on the audio signal. For example, the presence or absence of a climax in a broadcast program can be determined based on the waveform of an audio signal of the program, and a broadcast program without any climax can be made a target of deletion. Specifically, the rate of climax of a broadcast program can be calculated based on the waveform of an audio signal thereof.

Further, in this example, it is configured such that in cases where a recorded broadcast program did not show a climax to such an extent as expected by the user, it is deleted immediately, but it may instead be configured such that the recorded broadcast program is not deleted immediately. For example, in cases where the automatic deletion determination part 800 acquires a video recording capacity (recording region) from the broadcast program recording part 600 in a periodic manner and the video recording capacity becomes less than a predetermined value, the broadcast program with the lowest rate of climax (the broadcast program which has been made a target of deletion) may be deleted preferentially. In addition, in cases where the video recording capacity becomes less than the predetermined value (e.g., 1 GB - 5 GB) at the time when one broadcast program has been recorded, already existing recorded broadcast programs of which the volume level is equal to or lower than the threshold may be deleted. At this time, all the programs with their volume level being equal to or lower than the threshold can be deleted collectively as a whole, or they can be deleted one by one in order from the lowest to highest volume level. In cases where the rates of climax of all the recorded broadcast programs are larger than the threshold, the recorded broadcast programs can be deleted sequentially in order from the earliest to latest video recording times, or from the lowest to highest rates of climax. In addition, it may be configured such that broadcast programs of a specific genre are preferentially deleted among those broadcast programs which have been made the targets of deletion. Of course, the priority of deletion of a recorded broadcast program can be determined based on whether the recorded broadcast program has been viewed, the time elapsed from the time of recording thereof, etc.

For example, in cases where a user has viewed a recorded broadcast program, the possibility that the user is interested in the broadcast program concerned is high. Therefore, in such a case, the broadcast program concerned may not be deleted. In addition, only during the time when a broadcast program being currently recorded is being viewed with the output of the broadcast receiving and playing part 100 or with the output of the broadcast program recording part 600, the broadcast program concerned may not be deleted.

SECOND EXAMPLE

Next, a video recording and playing apparatus according to a second example of the present invention will be described. The video recording and playing apparatus according to this second example determines a broadcast program(s) to be deleted from a plurality of recorded broadcast programs based on the viewership or ratings of the broadcast programs. Specifically, the rate of climax of a broadcast program is calculated based on the rating of the broadcast program acquired from a rating management server that is connected to the Internet. Here, note that the explanation will be omitted about those portions which overlap with the first example.

In this example, the video recording and playing apparatus 1 is connected to the Internet and acquires the rating of a broadcast program from the rating management server connected to the Internet. Specifically, instantaneous rating on each time point is acquired.

The rating management server calculates the ratings of broadcast programs in real time, and outputs the rating of a designated broadcast program due to a request from the video recording and playing apparatus 1.

Hereinafter, reference will be made to the internal configuration of the video recording and playing apparatus 1 according to this second example. The video recording and playing apparatus 1 according to this example further includes a network interface other than the configuration of FIG. 2.

A CPU 11 according to this example has, in addition to the functions described in the first example, a function to output a rating acquisition request to the network interface. Specifically, the CPU 11 instructs the transmission of data (acquired rating data) for acquiring the rating of a broadcast program from the rating management server. In addition, the CPU 11 calculates the rate of climax of a broadcast program based on the rating of the broadcast program acquired from the network interface, and determines based on the calculated result whether the broadcast program should be automatically deleted.

When the transmission of acquired rating data is instructed from the CPU 11, the network interface outputs the acquired rating data to the rating management server through the Internet. In addition, upon reception of the rating of the broadcast program from the rating management server through the Internet, the network interface outputs the received rating to the CPU 11.

Figure 8:
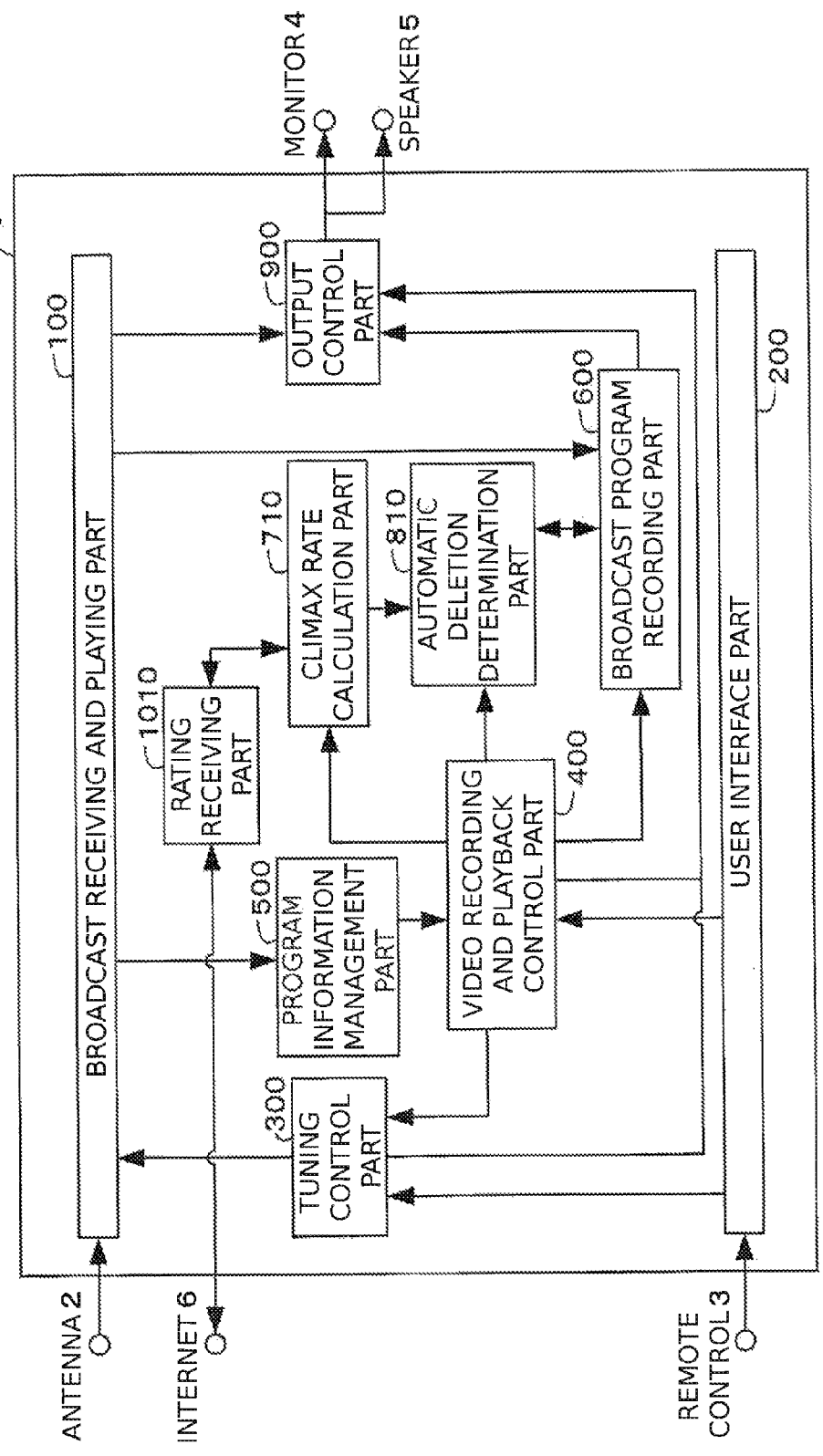
FIG. 8 is a functional block diagram of the video recording and playing apparatus according to a second example.

FIG. 8 is a functional block diagram of the video recording and playing apparatus 1 according to this second example.

A climax rate calculation part 710 periodically outputs a rating acquisition request to a rating receiving part 1010 in accordance with a climax rate calculation request received from a video recording and playback control part 400. Then, the climax rate calculation part 710 calculates the rate of climax of a broadcast program based on a rating acquired from the rating receiving part 1010, and ends the calculation of the rate of climax in accordance with a climax rate calculation end request received from the video recording and playback control part 400. In addition, the rating acquisition request contains program information and time information for identifying a broadcast program which is a target for calculation of the rate of climax, and the climax rate calculation part 710 is able to request the rating of a broadcast program in a specified time. Here, note that in this example, a maximum value of the rating in a broadcast program is assumed to be the rate of climax.

Upon reception of the automatic deletion determination request from the video recording and playback control part 400, the automatic deletion determination part 810 determines, based on the rate of climax of the broadcast program acquired from the climax rate calculation part 710, whether the recorded broadcast program is made a target of deletion. In cases where the broadcast program is made a target of deletion, a deletion request for deleting the broadcast program concerned is outputted to the broadcast program recording part 600.

In accordance with the rating acquisition request received from the climax rate calculation part 710, the rating receiving part 1010 acquires the rating of the broadcast program from the rating management server connected to the Internet, and outputs the rating thus acquired to the climax rate calculation part 710.

Figure 9A:
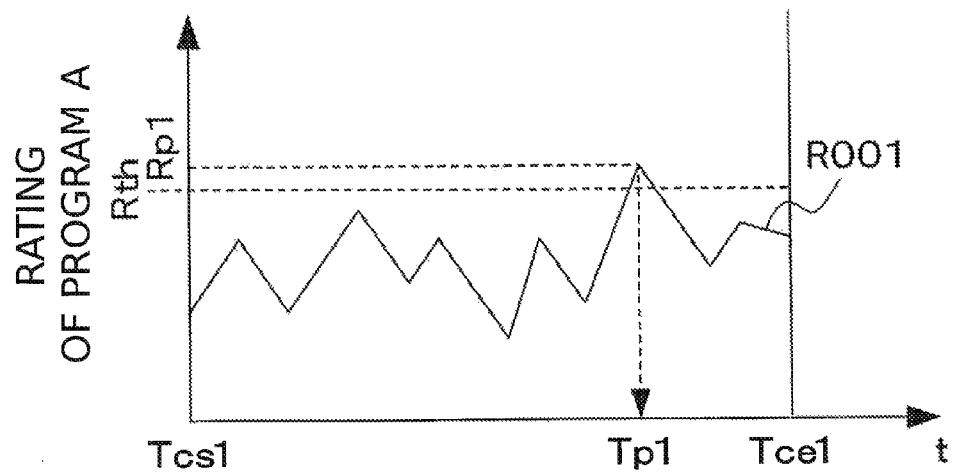
FIG. 9A and FIG. 9B show examples of the change of the rating from the start of broadcasting a program to the end thereof, wherein the axis of ordinate represents time and the axis of abscissa represents the rating.
Figure 9B:
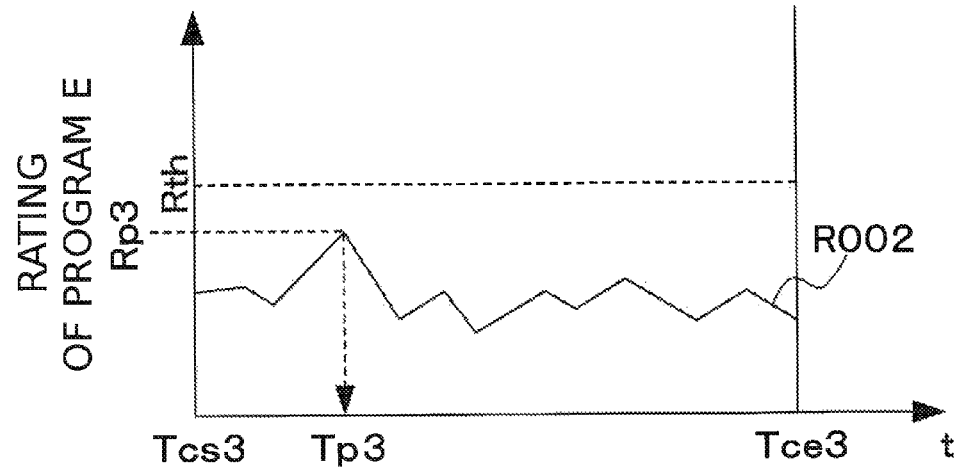

FIG. 9A and FIG. 9B show examples of the change of the rating from the start of broadcasting a program to the end thereof, wherein the axis of ordinate represents time and the axis of abscissa represents the rating. In addition, a value "Rth" of the rating is a threshold for determining whether there is any climax. Here, note that the threshold "Rth" is assumed to be beforehand set in the video recording and playing apparatus 1. The rating of "program A" changes as shown by R001, and becomes a maximum value of "Rp1" at a time point of "Tp1" (FIG. 9A). The maximum value "Rp1" is larger than the threshold "Rth". On the other hand, the rating of "program E" changes as shown by R002, and becomes a maximum value of "Rp3" at a time point of "Tp3" (FIG. 9B). The maximum value "Rp3" is smaller than the threshold "Rth". In this example, in cases where the maximum value of the rating is larger than "Rth", it is determined that there is a climax in the broadcast program, and in cases where the maximum value of the rating is equal to or less than "Rth", it is determined that there is no climax in the broadcast program.

Figure 10:
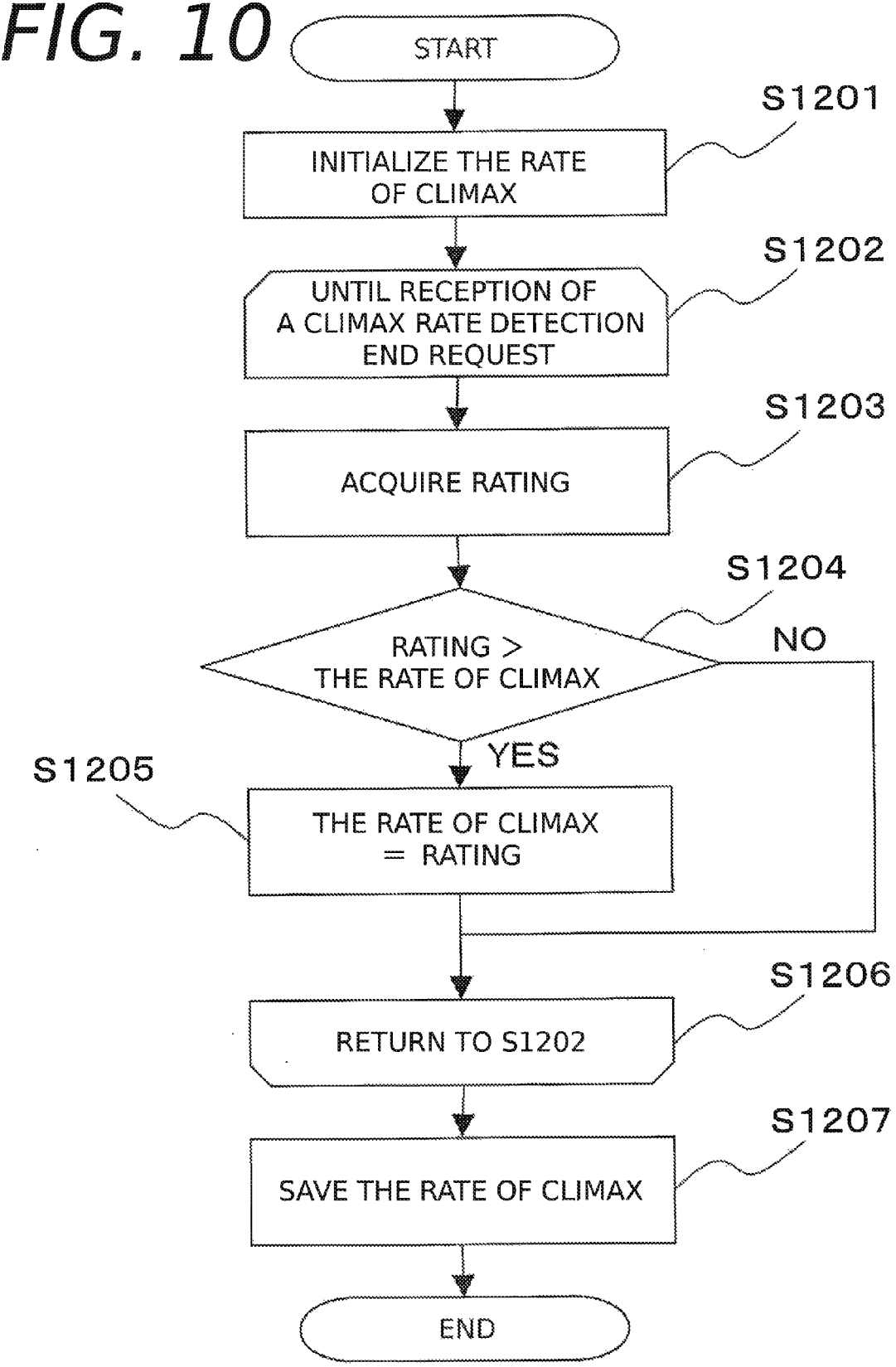
FIG. 10 is a flow chart showing an operation of a climax rate calculation part according to the second example at the time of receiving a climax rate calculation request.

FIG. 10 is a flow chart showing the operation of the climax rate calculation part 710 at the time of receiving a climax rate calculation request from the video recording and playback control part 400.

Upon reception of a climax rate calculation request for a broadcast program from the video recording and playback control part 400, the climax rate calculation part 710 initializes the rate of climax with respect to the broadcast program (S1201). Specifically, the rate of climax is made to zero. Thereafter, processings from S1203 to S1206 are repeated until when the climax rate calculation part 710 receives a climax rate calculation end request (S1202).

First, a rating acquisition request is outputted to the rating receiving part 1010, and the rating of a target broadcast program at a processing time point (a time point at which the processing is performed) is acquired (S1203). Then, it is checked whether the rating thus acquired is larger than the rate of climax (S1204). In cases where the acquired rating is larger than the rate of climax (S1204: YES), the acquired rating is set to the rate of climax (S1205), whereas in cases where the acquired rating is equal to or less than the rate of climax (S1204: NO), the rate of climax is not updated.

Then, a return is made to S1202 (S1206). The processings from S1203 to S1206 are repeated until when a climax rate calculation end request is received, as mentioned above.

When a climax rate calculation end request is received, the program information contained in the climax rate calculation request and the rate of climax are saved while being associated with each other (S1207). When the above-mentioned processing is performed in the case of FIG. 9A, the rate of climax becomes Rp1, whereas when the above-mentioned processing is performed in the case of FIG. 9B, the rate of climax becomes Rp3.

Figure 11:
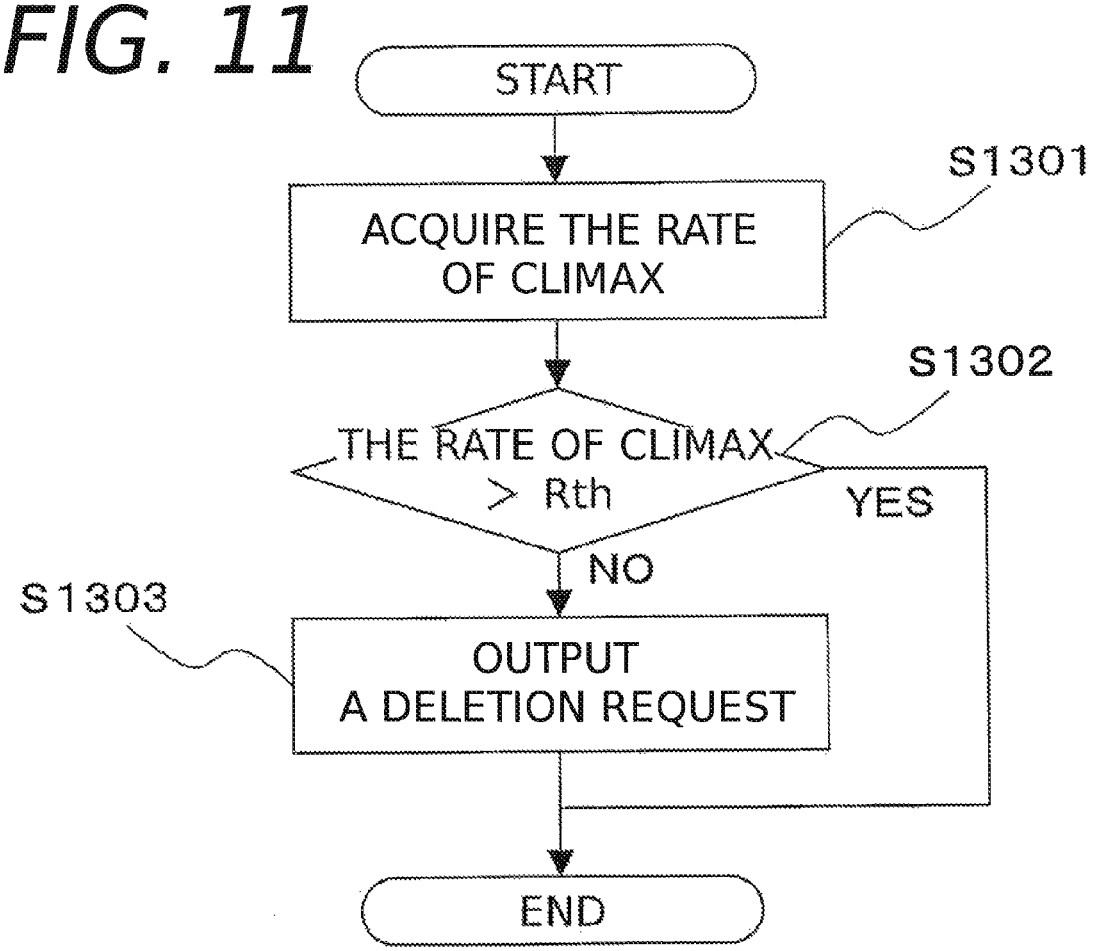
FIG. 11 is a flow chart showing an operation of an automatic deletion determination part according to the second example at the time of receiving an automatic deletion determination request.
Figure 14:
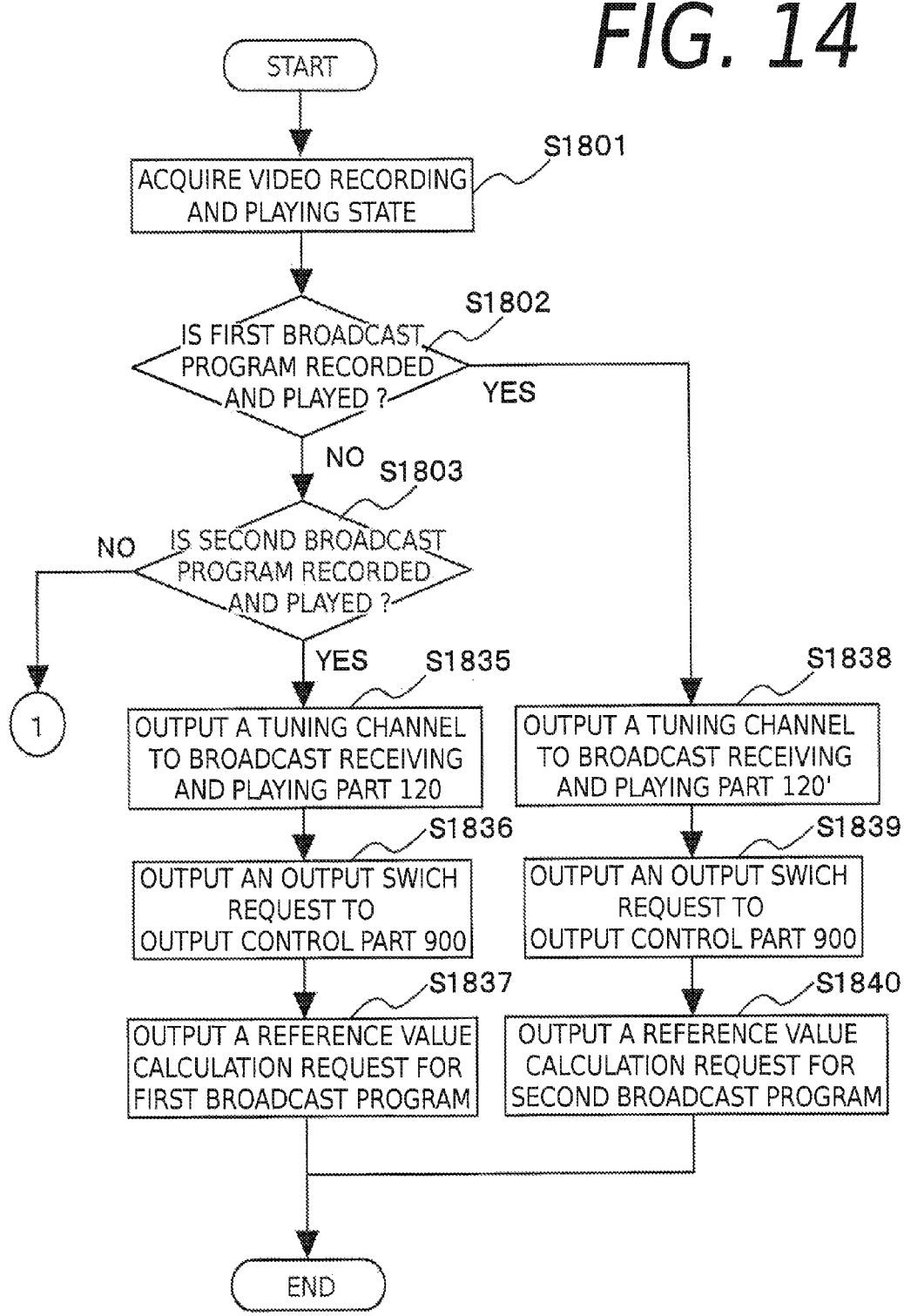
FIG. 14 is a flow chart showing an operation of a tuning control part according to a third example at the time of receiving a tuning request.
Figure 15:
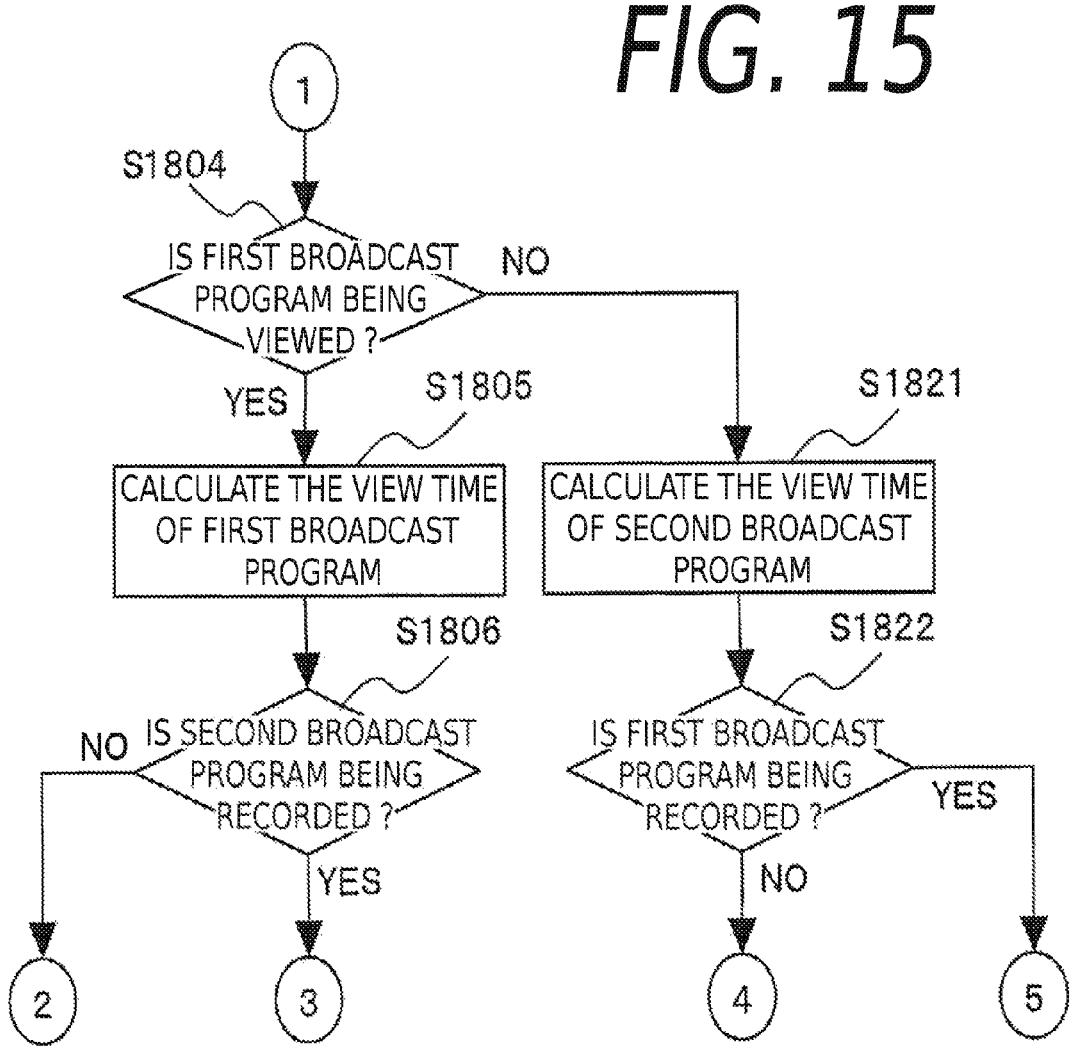
FIG. 15 is a flow chart showing an operation of the tuning control part according to the third example at the time of receiving the tuning request.
Figure 16:
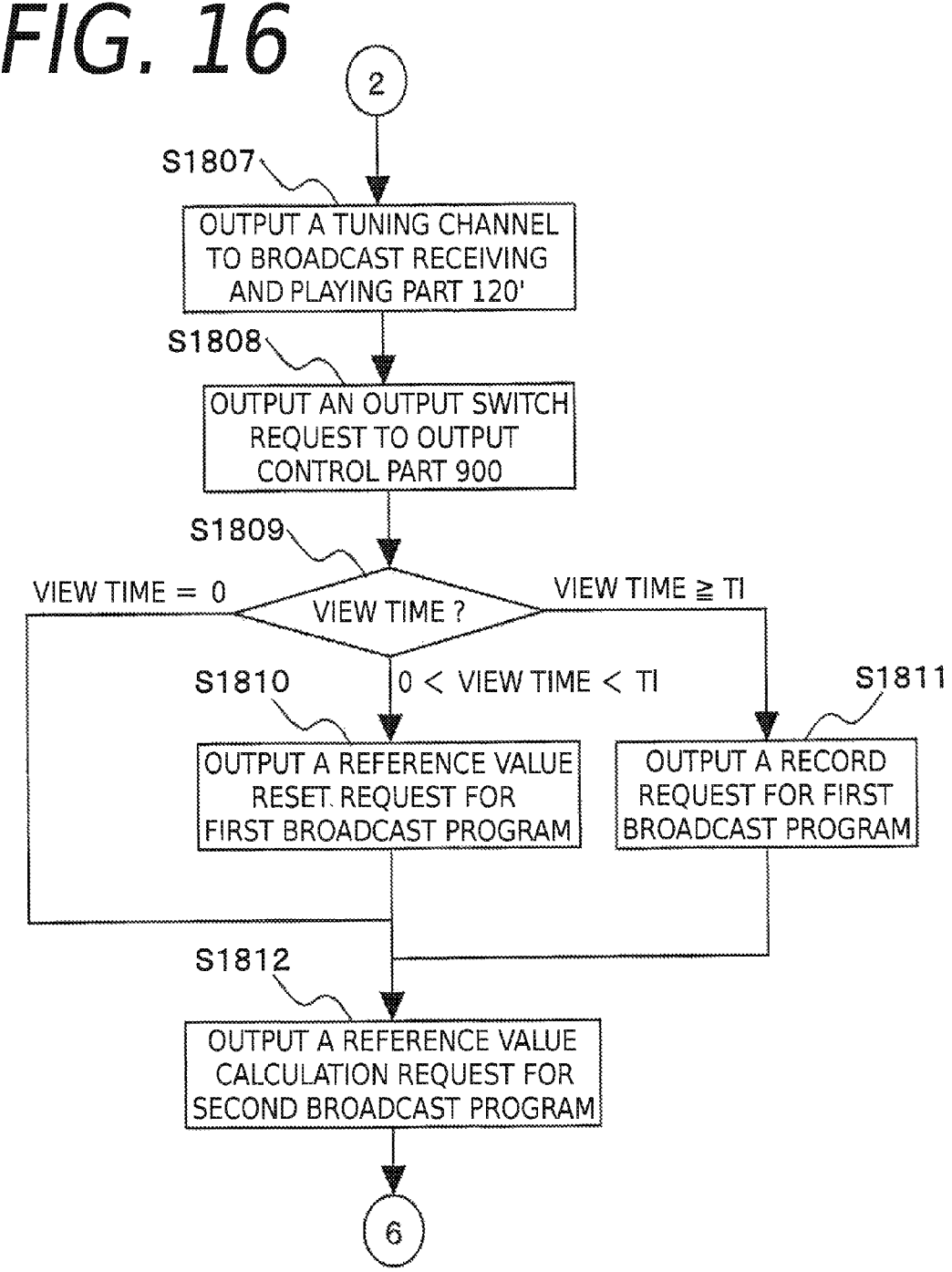
FIG. 16 is a flow chart showing an operation of the tuning control part according to the third example at the time of receiving the tuning request.
Figure 17:
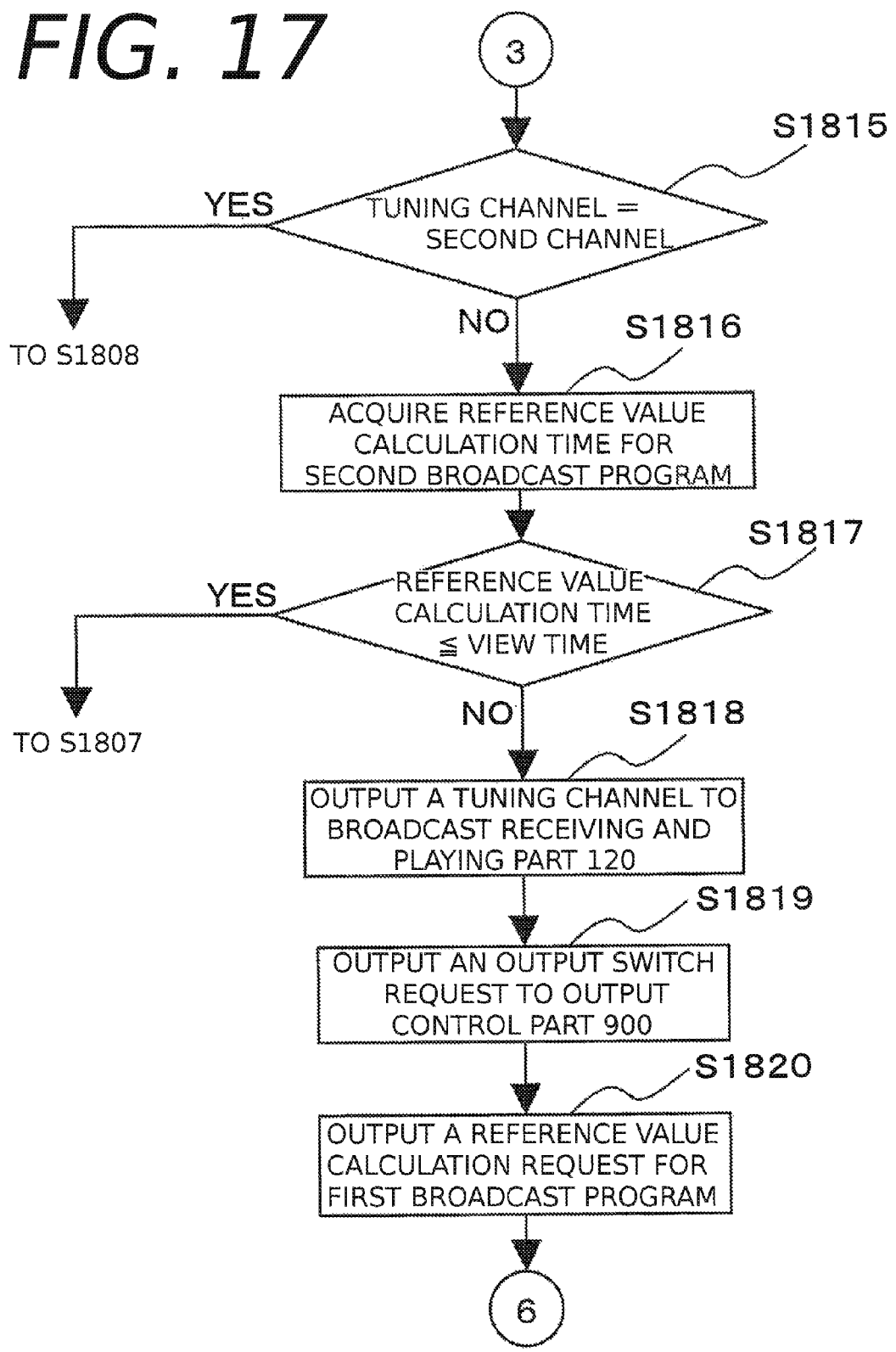
FIG. 17 is a flow chart showing an operation of the tuning control part according to the third example at the time of receiving the tuning request.
Figure 18:
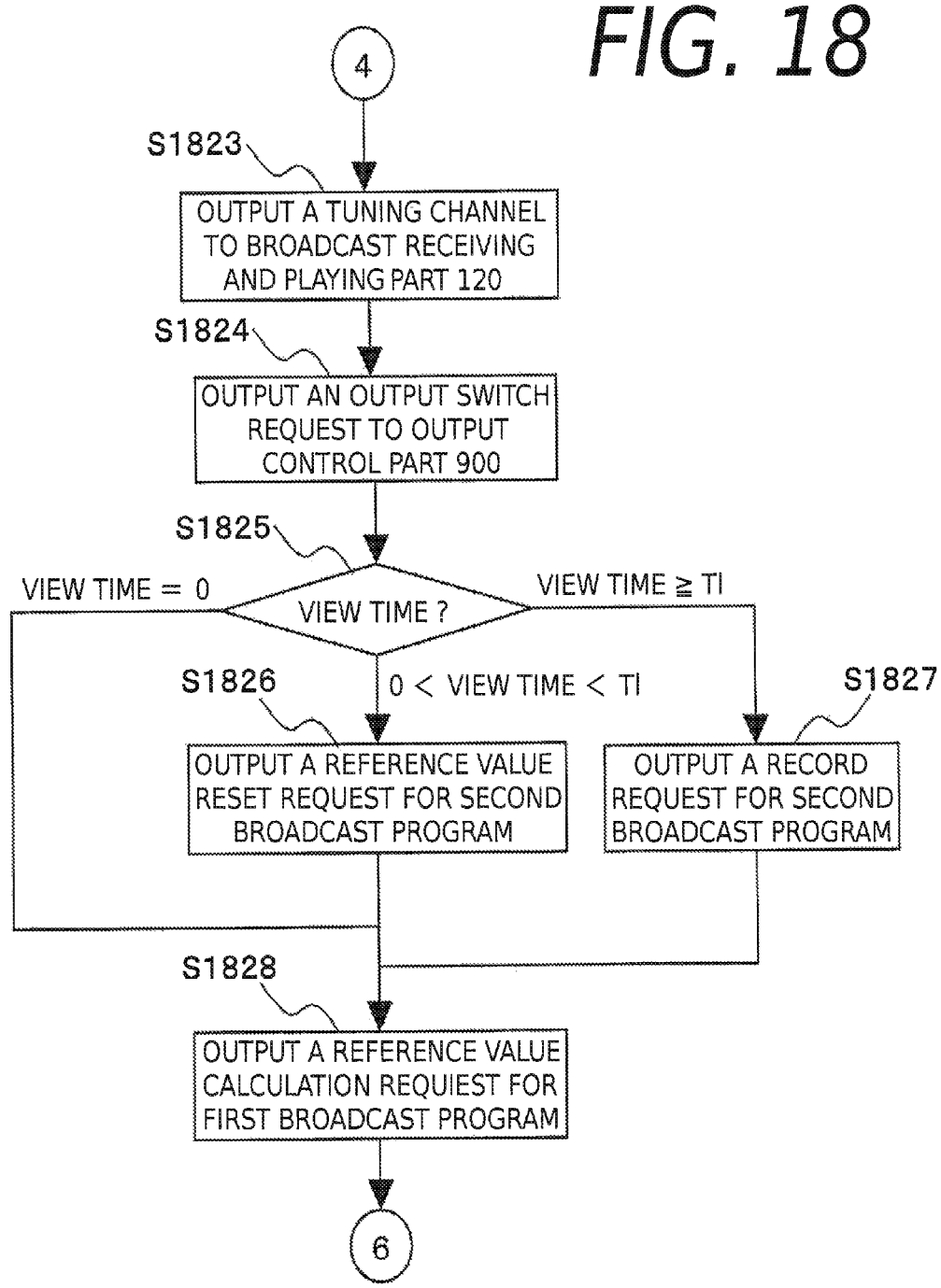
FIG. 18 is a flow chart showing an operation of the tuning control part according to the third example at the time of receiving the tuning request.
Figure 19:
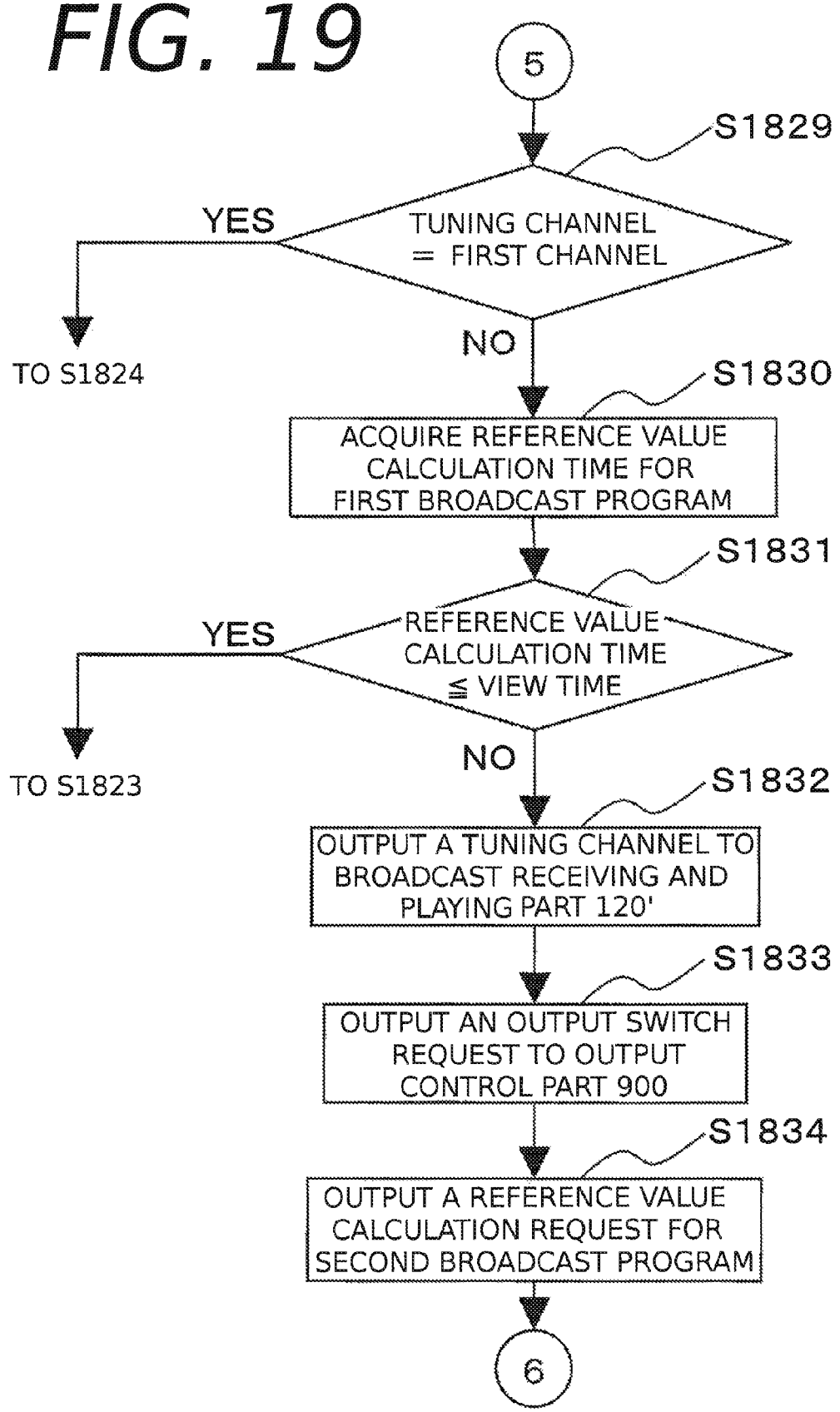
FIG. 19 is a flow chart showing an operation of the tuning control part according to the third example at the time of receiving the tuning request.

FIG. 11 is a flow chart showing the operation of the automatic deletion determination part 810 at the time of receiving an automatic deletion determination request from the video recording and playback control part 400. Here, note that automatic deletion determination processing will be described in the cases of FIG. 9A and FIG. 9B.

When an automatic deletion determination request for a broadcast program is received from the video recording and playback control part 400, the automatic deletion determination part 810 acquires the rate of climax of the broadcast program from the climax rate calculation part 710 (S1301), and determines whether the rate of, climax is larger than the threshold "Rth" (S1302). In the case of FIG. 9A, the rate of climax "Rp1" is larger than the threshold "Rth", so the result of the determination corresponds to "YES" in S1302, and the automatic deletion determination processing is ended. On the other hand, in the case of FIG. 9B, the rate of climax "Rp3" is equal to or less than the threshold "Rth", so the result of the determination corresponds to "NO" in S1302, and a deletion request for "program E" is outputted to the broadcast program recording part 600 (S1303).

Thus, in this example, when a broadcast program matching with a condition which has been inputted by a user is automatically recorded, the rate of climax of the broadcast program is calculated based on the rating of the broadcast program. Then, in cases where the rate of climax is less than the threshold, the broadcast program concerned is deleted in an automatic manner. By so doing, it is possible to eliminate the troublesomeness of manually deleting the broadcast program which did not show such a rate of climax as expected by the user. In addition, because among a plurality of broadcast programs automatically recorded, those which showed a climax are saved, it is possible to decrease the possibility that the user overlooks the broadcast programs having showed a climax.

Although in this example, reference has been made to the case in which the threshold for the rating was beforehand set in the video recording and playing apparatus 1, the threshold may be able to be suitably set by the user.

In addition, although in this example, a recorded broadcast program of which the maximum value of the rating is equal to or less than the threshold is determined as a broadcast program without a climax and is set as a target of deletion, a broadcast program in which an average value of the rating is equal to or less than the threshold can be determined as a target of deletion. Similar to the level of sound, in cases where the video recording capacity becomes less than a predetermined value (e.g., 1 GB-5 GB) at the time when one broadcast program has been recorded, already existing recorded broadcast programs of which the rating is equal to or lower than a threshold may be deleted. At this time, all the programs with their rating being equal to or lower than the threshold can be deleted collectively as a whole, or can be deleted one by one in order from the lowest to highest rating.

In addition, it may be configured such that whether a broadcast program which is a target of deletion is determined based on an audio signal or based on a rating is selected based on the program information of the target broadcast program. For example, it may be configured such that whether the rate of climax is calculated based on an audio signal or based on a rating is selected based on the program information of the target broadcast program.

For example, whether a broadcast program which is a target of deletion is determined based on an audio signal or based on a rating may be selected in accordance with the genre of the broadcast program, as shown in FIG. 12. In an example of FIG. 12, in cases where the genre of the broadcast program is a "drama", it is determined based on the rating of the program whether the broadcast program concerned is made a target of deletion. Also, in cases where the genre of a broadcast program is a "variety" or a "sport", it is determined based on the audio signal of the program whether the broadcast program concerned is made a target of deletion.

Here, note that FIG. 12 shows the example in the case of selecting whether a broadcast program which is made a target of deletion is determined based on the audio signal or rating of the program, in accordance with the genre of the broadcast program, but such a selection can be made in accordance with other information contained in the program information. The selection can be made based on a plurality of pieces of information. Such other information is, for example, whether it is a live broadcast or not, whether it is a rebroadcast or not, etc.

In addition, although in this example, the rating of a broadcast program is directly acquired from the rating management server connected to the Internet, it may be acquired through an in-home PC. Any configuration can be used as long as the ratings of broadcast programs can be acquired.

THIRD EXAMPLE

Now, a video recording and playing apparatus according to a third example of the present invention will be described. The video recording and playing apparatus according to this example starts the recording of a broadcast program after a user interrupts the viewing of the broadcast program. Then, the video recording and playing apparatus determines a broadcast program which becomes a target of deletion, by making a comparison between audio signals or ratings thereof in a predetermined period during the viewing of the broadcast program and in a recording period in which the broadcast program is recorded. Here, note that the explanation will be omitted about those portions which overlap with the first or second example. In the following, reference will be made to a case in which a broadcast program to be made a target of deletion is determined based on an audio signal of the program.

Hereinafter, reference will be made to the internal configuration of the video recording and playing apparatus 1 according to this third example. The video recording and playing apparatus 1 according to this example further includes a tuner and a decoder other than the configuration of FIG. 2 (i.e., includes two tuners and two decoders, respectively). In the following, the additional tuner and the additional decoder, which are newly provided in this example, will be described as a tuner 12' and a decoder 13', respectively.

A CPU 11 according to this example has a function to control the tuner 12' and the decoder 13', in addition to the functions described in the first example. In addition, the CPU 11 calculates the rate of climax of a broadcast program based on the audio signal of the broadcast program outputted from the decoder 13', and determines based on the calculated result whether the broadcast program should be automatically deleted.

The tuner 12' has the same function as the tuner 12, and hence it extracts a broadcast signal, and outputs it to the decoder 13'.

The decoder 13' has the same function as the decoder 13. Specifically, the decoder 13' outputs the video signal and the audio signal thus decoded to a video audio output circuit 17, and records in a memory 15 program information such as a program name, a broadcast start time, etc., included in the data signal. In addition, the decoder 13' outputs the coded video signal and the coded audio signal to the HDD 16. The audio signal is also outputted to the CPU 11 in order to calculate the rate of climax.

The video audio output circuit 17 according to this example has a function to receive the video signal outputted from the decoder 13', and to output it to the monitor 4 after converting the video signal into a format suitable for the monitor 4, in addition to the functions described in the first example. In addition, the video audio output circuit 17 receives the audio signal outputted from the decoder 13', and outputs it to the speaker 5 after converting the audio signal into a format suitable for the speaker 5.

Next, the functional configuration of the video recording and playing apparatus 1 will be described. The video recording and playing apparatus 1 according to this third example further includes a broadcast receiving and playing part and a reference value calculation part in addition to the configuration of FIG. 3. In the following, the additional broadcast receiving and playing part which is newly provided in this example will be described as a broadcast receiving and playing part 100'.

The broadcast receiving and playing part 100 and the broadcast receiving and playing part 100' according to this example each have a function to output a decoded audio signal to the reference value calculation part, in addition to the functions of the broadcast receiving and playing part 100 according to the first example.

Upon reception of a tuning request from a user interface part 200, a tuning control part 300 selects either the broadcast receiving and playing part 100 or the broadcast receiving and playing part 100', and outputs a tuning channel according to the tuning request to the broadcast receiving and playing part thus selected. At that time, the tuning control part 300 outputs an output switch request to an output control part 900 so that a video signal and an audio signal outputted from the selected broadcast receiving and playing part are supplied to a monitor 4 and a speaker 5, respectively. In addition, the tuning control part 300 stores output source information that indicates from which of the broadcast receiving and playing parts the video signal and the audio signal are outputted, i.e., which of the broadcast receiving and playing parts has been selected, and the time of tuning (the time when tuning was done). Further, the tuning control part 300 outputs a reference value calculation request for calculating the rate of climax (reference value) during viewing of the broadcast program to the reference value calculation part. Also, the tuning control part 300 outputs a reference value calculation end request to the reference value calculation part in order to end the calculation of the reference value.

Moreover, the tuning control part 300 outputs to the video recording and playback control part 400 a record request for recording the video signal and the audio signal which are outputted by the broadcast receiving and playing part 100 or the broadcast receiving and playing part 100'. Also, the tuning control part 300 outputs a video recording stop request to the video recording and playback control part 400 in order to stop the video recording thereof.

The video recording and playback control part 400 determines a broadcast program to be recorded based on the record request received from the tuning control part 300 and the program information acquired from the program information management part 500, and outputs a recording start request to the broadcast program recording part 600. At that time, the video recording and playback control part 400 outputs a climax rate calculation request to the climax rate calculation part 700 so as to calculate the rate of climax during recording of the broadcast program. In cases where the recording of the broadcast program is stopped, such as when the broadcast program being currently recorded is completed, or when a video recording stop request is received from the tuning control part 300, etc., the video recording and playback control part 400 outputs a recording end request, a climax rate calculation end request, and an automatic deletion determination request. Specifically, the video recording and playback control part 400 outputs the video recording end request to the broadcast program recording part 600, the climax rate calculation end request to the climax rate calculation part 700, and the automatic deletion determination request to an automatic deletion determination part 800, respectively. In addition, the video recording and playback control part 400 outputs a recorded program output request for outputting a recorded broadcast program to the broadcast program recording part 600 in accordance with a playback request received from the user interface part 200. At that time, the video recording and playback control part 400 outputs an output switch request to the output control part 900 so that the video signal and the audio signal outputted from the broadcast program recording part 600 are supplied to the monitor 4 and the speaker 5, respectively. Moreover, the video recording and playback control part 400 outputs a video recording and playing (playback) state indicating which of the broadcast receiving and playing parts is used for recording, or whether a broadcast program during recording is played back, in accordance with a request from the tuning control part 300. Here, note that each of the recording start request, the recording end request, the climax rate calculation request, the climax rate calculation end request, and the automatic deletion determination request includes program information for identifying a target broadcast program.

The program information management part 500 stores program information with respect to broadcast programs and broadcast scheduled programs. Such program information is periodically acquired and updated by the broadcast receiving and playing part 100 and the broadcast receiving and playing part 100'. In addition, the program information management part 500 outputs the program information according to a request from the tuning control part 300, the video recording and playback control part 400, and the reference value calculation part.

The broadcast program recording part 600 according to this example has, in addition to the functions described in the first example, a function to record the video signal and the audio signal outputted by the broadcast receiving and playing part 100 or the broadcast receiving and playing part 100' while associating them with program information.

Upon reception of the automatic deletion determination request from the video recording and playback control part 400, the automatic deletion determination part 800 determines whether a recorded broadcast program is made a target of deletion. Specifically, the automatic deletion determination part 800 determines whether a recorded broadcast signal is made a target of deletion, by making a comparison between the reference value acquired from the reference value calculation part and the rate of climax acquired from the climax rate calculation part 700. In cases where the broadcast program is made a target of deletion, the automatic deletion determination part 800 outputs a deletion request for deleting the recorded broadcast program to the broadcast program recording part 600.

Upon reception of the reference value calculation request from the tuning control part 300, the reference value calculation part calculates the rate of climax of the broadcast program being currently viewed based on the audio signal of the broadcast program. Then, the reference value calculation part stores the time at which the reference value is calculated as a reference value calculation time, and also stores the rate of climax thus calculated as a reference value. In addition, the reference value calculation part ends the calculation of the reference value in accordance with the reference value calculation end request received from the tuning control part 300.

FIG. 13 is a view showing examples of a view period and a video recording period (recording period) of a broadcast program. In this figure, a portion filled with black denotes the view period of the broadcast program, and a diagonally shaded area denotes the recording period of the broadcast program, and a portion surrounded by a broken line denotes a period in which neither viewing nor recording is carried out.

The reference character (a) in FIG. 13 shows that a user has started to view "program A" which is being broadcast in channel "Ch. X" by activating the video recording and playing apparatus 1 at time point "Tvs1"; (b) in FIG. 13 shows that the user has started to view "program B" by changing the channel to "Ch. Y" at time "Tve1" after (a); (c) in FIG. 13 shows that the user has started to view (playback) the "program A" being currently recorded at time "Trs1" after (b); (d) in FIG. 13 shows that the user has started to view "program C" by changing the channel to "Ch. Z" at time "Tvs2" after (c); (d') in FIG. 13 shows that the user has started to view "program D" by changing the channel to "Ch. P" at time "Tvs2'" after (c); (e) in FIG. 13 shows that the user has started to view the "program C" by changing the channel to "Ch. Z" at time "Tve2" after (b); and (f) in FIG. 13 shows that the user has started to view the "program D" by changing the channel to "Ch. P" at time "Tve3" after (e).

Hereinafter, the operation of the tuning control part 300 at the time of receiving a tuning request from the user interface part 200 will be described. FIGS. 14 through 20 are flow charts showing the operation of the tuning control part 300 at the time of receiving a tuning request from the user interface part 200. Here, note that in these figures, a value "Tl" to be compared with the length of a view period (view time) is a threshold for determining whether the tuning (or channel selection) operation of the user switches channels frequently, i.e., whether the switching of channels is done due to zapping. Although in this example, it is assumed that the threshold is beforehand set in the video recording and playing apparatus 1, such a threshold may be able to be set and changed by the user.

First, reference will be made to the operation of the tuning control part 300 at the time when the operation shown in (a) of FIG. 13 is carried out.

Upon reception of a tuning request for channel "Ch. X" from the user interface part 200, the tuning control part 300 acquires a video recording and playback state from the video recording and playback control part 400 (S1801).

Then, it is checked from the video recording and playback state thus acquired whether a broadcast program (first broadcast program) outputted by the broadcast receiving and playing part 100 is being currently played while at the same time being recorded (S1802). At time point "Tvs1", the video recording and playback control part 400 is not performing the video recording and playback of the broadcast program (S1802: NO), so the control flow proceeds to S1803.

In S1803, it is checked from the acquired video recording and playback state whether a broadcast program (second broadcast program) outputted by the broadcast receiving and playing part 100' is being currently played while at the same time being recorded. At time point "Tvs1", the result of check corresponds to "NO" in S1803, so the control flow advances to S1804.

In S1804, it is checked from the video recording and playing state and output source information whether the broadcast program outputted by the broadcast receiving and playing part 100 is currently being viewed. At time point "Tvs1", the viewing of the broadcast programs concerned is not yet done (S1804: NO), so the control flow advances to S1821.

In S1821, the view time of the broadcast program outputted by the broadcast receiving and playing part 100' is calculated from the video recording and playing state, the output source information, the tuning time point, the current time "Tvs1", and the program information. However, at this time, the viewing of the broadcast program is not done, so the view time becomes 0.

Subsequently, it is checked from the video recording and playing state whether the broadcast program outputted by the broadcast receiving and playing part 100 is being currently recorded (S1822). At this time point, the recording of the broadcast program is not performed (S1822: NO), so the control flow advances to S1823.

In S1823, a tuning channel "Ch. X" is outputted to the broadcast receiving and playing part 100. At this time, the time point "Tvs1" is stored as a tuning time point together with the tuning channel "Ch. X".

Then, an output switch request for outputting a video signal and an audio signal from the broadcast receiving and playing part 100 is outputted to the output control part 900 (S1824). At this time, the "broadcast receiving and playing part 100" is stored as output source information.

Then, the view time calculated in S1821 is compared with "Tl" (S1825). Here, because the calculated view time is 0, a reference value calculation request for the "program A" which is outputted by the broadcast receiving and playing part 100 is outputted to the reference value calculation part (S1828).

Thereafter, it is checked whether the tuning channel has been outputted to that broadcast receiving and playing part which is being used for video recording (S1813). At this time point, video recording is not performed, which corresponds to "NO" in S1813, and the processing is ended.

Next, reference will be made to the operation of the tuning control part 300 at the time when the operation shown in (b) of FIG. 13 is carried out. Here, it is assumed that the length of time from time point "Tvs1" to time point "Tve1" is longer than "Tl".

Upon reception of a tuning request for channel "Ch. Y" from the user interface part 200, the tuning control part 300 acquires a video recording and playback state from the video recording and playback control part 400 (S1801).

Then, it is checked from the acquired video recording and playback state whether a broadcast program outputted from the broadcast receiving and playing part 100 or the broadcast receiving and playing part 100' is being currently played while at the same time being recorded (S1802, S1803). At time point "Tve1", similar to the case of (a) in FIG. 13, the recording and playback of the broadcast program are not done (S1802: NO, and S1803: NO), so the control flow advances to S1804.

In S1804, it is checked from the video recording and playing state and output source information whether the broadcast program outputted by the broadcast receiving and playing part 100 is currently being viewed. At time point "Tve1", the "program A" outputted by the broadcast receiving and playing part 100 is being viewed (S1804: YES), so the control flow advances to S1805.

In S1805, the view time "Tve1−Tvs1" of the broadcast program outputted by the broadcast receiving and playing part 100 is calculated from the video recording and playing state, the output source information, the tuning time point, the current time "Tve1", and the program information.

Subsequently, it is checked from the video recording and playing state whether the broadcast program outputted, by the broadcast receiving and playing part 100' is being currently recorded (S1806). At this time point, the recording of the broadcast program is not performed (S1806: NO), so the control flow advances to S1807.

In S1807, a tuning channel "Ch. Y" is outputted to the broadcast receiving and playing part 100'. At this time, the time point "Tve1" is stored as a tuning time point together with the tuning channel "Ch. Y".

Then, an output switch request for outputting a video signal and an audio signal from the broadcast receiving and playing part 100' is outputted to the output control part 900 (S1808). At this time, the "broadcast receiving and playing part 100'" is stored as output source information.

Then, the view time calculated in S1805 is compared with "Tl" (S1809). Here, the calculated view time is "Tve1−Tvs1", and this value is equal to or larger than "Tl", as stated above. Therefore, a reference value calculation end request for the "program A" outputted by the broadcast receiving and playing part 100 is outputted to the reference value calculation part, and a record request for the "program A" outputted by the broadcast receiving and playing part 100 is outputted to the video recording and playback control part 400 (S1811). As a result, the video recording of the "program A" and the calculation of the rate of climax are started.

Subsequently, a reference value calculation request for the "program B" outputted by the broadcast receiving and playing part 100' is outputted to the reference value calculation part (S1812).

Then, it is checked whether the tuning channel has been outputted to that broadcast receiving and playing part which is being used for video recording (S1813). Here, the tuning channel is outputted to the broadcast receiving and playing part 100' that is not performing recording, which corresponds to "NO" in S1813, and the processing is ended.

Here, in cases where the calculated view time is 0, i.e., in the case of Tve1=Tvs1, the control flow advances to S1812 from S1809. In addition, in S1809, in cases where the calculated view time is longer than zero and it is shorter than "Tl", there is a high possibility that the viewing of the "program A" is due to zapping. Therefore, in such a case, a reference value reset request for resetting (to zero) the reference value for the broadcast program outputted by the broadcast receiving and playing part 100, i.e., the reference value calculated during the viewing of the "program A", is outputted to the reference value calculation part (S1810). Then, the control flow advances to S1812.

Next, reference will be made to the operation of the tuning control part 300 at the time when the operation shown in (d) of FIG. 13 is carried out.

Upon reception of a tuning request for channel "Ch. Z" from the user interface part 200, the tuning control part 300 acquires a video recording and playback state from the video recording and playback control part 400 (S1801).

Then, it is checked from the video recording and playback state thus acquired whether a broadcast program outputted by the broadcast receiving and playing part 100 is being currently played while at the same time being recorded (S1802). At time point "Tvs2", the "program A" outputted by the broadcast receiving and playing part 100 is being played during recording (S1802: YES), so the control flow advances to S1838.

In S1838, a tuning channel "Ch. Z" is outputted to the broadcast receiving and playing part 100'. At this time, the time point "Tvs2" is stored as a tuning time point together with the tuning channel "Ch. Z". At this time point, the broadcast receiving and playing part 100' is being used for video recording the "program B", so a video recording stop request for the "program B" is outputted to the video recording and playback control part 400. As a result, the video recording of the "program B" and the calculation of the rate of climax are ended.

Then, an output switch request for outputting a video signal and an audio signal from the broadcast receiving and playing part 100' is outputted to the output control part 900 (S1839). At this time, the "broadcast receiving and playing part 100'" is stored as output source information.

Then, a reference value calculation request for the "program C" outputted by the broadcast receiving and playing part 100' is outputted to the reference value calculation part (S1840), and the processing is ended.

Here, note that the case in which the broadcast program outputted by the broadcast receiving and playing part 100' is being played while being recorded, instead of playing the broadcast program outputted by the broadcast receiving and playing part 100 while at the same time recording it, corresponds to "NO" in S1802, and to "YES" in S1803.

In that case, a tuning channel "Ch. Z" is outputted to the broadcast receiving and playing part 100 (S1835). At this time, the time point "Tvs2" is stored as a tuning time point together with the tuning channel "Ch. Z". Also, at this time point, the broadcast receiving and playing part 100 is being used for video recording the "program A", so a video recording stop request for the "program A" is outputted to the video recording and playback control part 400.

Then, an output switch request for outputting a video signal and an audio signal from the broadcast receiving and playing part 100 is outputted to the output control part 900 (S1836). At this time, the "broadcast receiving and playing part 100" is stored as output source information.

Then, a reference value calculation request for the "program C" outputted by the broadcast receiving and playing part 100 is outputted to the reference value calculation part (S1837), and the processing is ended.

Next, reference will be made to the operation of the tuning control part 300 at the time when the operation shown in (d') of FIG. 13 is carried out.

Upon reception of a tuning request for channel "Ch. P" from the user interface part 200, the tuning control part 300 acquires a video recording and playback state from the video recording and playback control part 400 (S1801).

Then, it is checked from the acquired video recording and playback state whether a broadcast program outputted from the broadcast receiving and playing part 100 or the broadcast receiving and playing part 100' is being currently played while at the same time being recorded (S1802, S1803). At time point "Tvs2'", the recorded "program A" is being played, but the video recording is ended (S1802: NO, and S1803: NO), so the control flow advances to S1804.

In S1804, it is checked from the video recording and playing state and output source information whether the broadcast program outputted by the broadcast receiving and playing part 100 is currently being viewed. At time point "Tvs2'", the recorded broadcast program is being played (S1804: NO), so the control flow advances to S1821.

In S1821, the view time of the broadcast program outputted by the broadcast receiving and playing part 100' is calculated from the video recording and playing state, the output source information, the tuning time point, the current time "Tvs2'", and the program information. However, at this time point, the recorded "program A" is being played, the view time becomes 0.

Subsequently, it is checked from the video recording and playing state whether the broadcast program outputted by the broadcast receiving and playing part 100 is being currently recorded (S1822). At this time point, the video recording is ended (S1822: NO), so the control flow advances to S1823.

In S1823, a tuning channel "Ch. P" is outputted to the broadcast receiving and playing part 100. At this time, the time point "Tvs2'" is stored as a tuning time point together with the tuning channel "Ch. P".

Then, an output switch request for outputting a video signal and an audio signal from the broadcast receiving and playing part 100 is outputted to the output control part 900 (S1824). At this time, the "broadcast receiving and playing part 100" is stored as output source information.

Then, the view time calculated in S1821 is compared with "Tl" (S1825). Here, because the calculated view time is 0, a reference value calculation request for the "program D" which is outputted by the broadcast receiving and playing part 100 is outputted to the reference value calculation part (S1828).

Thereafter, it is checked whether the tuning channel has been outputted to that broadcast receiving and playing part which is being used for video recording (S1813). At this time point, video recording is not performed, which corresponds to "NO" in S1813, and the processing is ended.

Next, reference will be made to the operation of the tuning control part 300 at the time when the operation shown in (e) of FIG. 13 is carried out. Here, it is assumed that the view time "Tve2–Tve1" of the "program B" is longer than the view time "Tve1–Tvs1" of the "program A".

Upon reception of a tuning request for channel "Ch. Z" from the user interface part 200, the tuning control part 300 acquires a video recording and playback state from the video recording and playback control part 400 (S1801).

Then, it is checked from the acquired video recording and playback state whether a broadcast program outputted from the broadcast receiving and playing part 100 or the broadcast receiving and playing part 100' is being currently played while at the same time being recorded (S1802, S1803). At time point "Tve2", the "program A" outputted by the broadcast receiving and playing part 100 is being recorded, but playback thereof is not being performed (S1802: NO, and S1803: NO), so the control flow advances to S1804.

In S1804, it is checked from the video recording and playing state and output source information whether the broadcast program outputted by the broadcast receiving and playing part 100 is currently being viewed. At time point "Tve2", the "program B" outputted by the broadcast receiving and playing part 100' is being viewed (S1804: NO), so the control flow advances to S1821.

In S1821, the view time "Tve2–Tve1" of the broadcast program outputted by the broadcast receiving and playing part 100' is calculated from the video recording and playing state, the output source information, the tuning time point, the current time "Tve2", and the program information.

Subsequently, it is checked from the video recording and playing state whether the broadcast program outputted by the broadcast receiving and playing part 100 is being currently recorded (S1822). At this time point, the "program A" outputted by the broadcast receiving and playing part 100 is being recorded (S1822: YES), so the control flow advances to S1829.

In S1829, it is checked whether the tuning request is a tuning request to the channel (first channel) to which the broadcast receiving and playing part 100 is tuning in. Here, the tuning request is a tuning request to the channel "Ch. Z", but not a tuning request to the channel "Ch. X" to which the broadcast receiving and playing part 100 is tuning in (S1829: NO), so the control flow advances to S1830.

In S1830, a reference value calculation time with respect to the "program A" outputted by the broadcast receiving and playing part 100 is acquired from the reference value calculation part. Here, the reference value calculation time becomes a period of time for which the user viewed the "program A", i.e., "Tve1–Tvs1".

Subsequently, the reference value calculation time thus acquired is compared with the view time calculated in S1821 (S1831). Here, "Tve2–Tve1" is equal to or more than "Tve1–Tvs1" (S1831: YES), so the control flow advances to S1823.

In S1823, a tuning channel "Ch. Z" is outputted to the broadcast receiving and playing part 100. At this time, the time point "Tve2'" is stored as a tuning time point together with the tuning channel "Ch. Z".

Then, an output switch request for outputting a video signal and an audio signal from the broadcast receiving and playing part 100 is outputted to the output control part 900 (S1824). At this time, the "broadcast receiving and playing part 100" is stored as output source information.

Then, the view time calculated in S1821 is compared with "Tl" (S1825). Here, the calculated view time is "Tve2–Tve1", and this value is equal to or larger than "Tl", as stated above. Therefore, a reference value calculation end request for the "program B" outputted by the broadcast receiving and playing part 100' is outputted to the reference value calculation part, and a record request for the "program B" outputted by the broadcast receiving and playing part 100' is outputted to the video recording and playback control part 400 (S1827).

Subsequently, a reference value calculation request for the "program C" outputted by the broadcast receiving and playing part 100 is outputted to the reference value calculation part (S1828).

Then, it is checked whether the tuning channel has been outputted to that broadcast receiving and playing part which is being used for video recording (S1813). Here, the tuning channel is outputted to the broadcast receiving and playing part 100 that is performing recording (S1813: YES), so the control flow advances to S1814.

In S1814, a video recording stop request for the "program A" outputted by the broadcast receiving and playing part 100 which has outputted the tuning channel is outputted to the video recording and playback control part 400 (S1814), and the processing is ended.

Here, note that in cases where the channel "Ch. X" to which the broadcast receiving and playing part 100 is tuning in is selected (S1829: YES), the control flow advances to S1824.

In cases where the view time calculated in S1821 is shorter than the reference value calculation time (S1831: NO), the tuning channel "Ch. Z" is outputted to the broadcast receiving and playing part 100' (S1832). At this time, the time point "Tve2" is stored as a tuning time point together with the tuning channel "Ch. Z". Then, an output switch request for outputting a video signal and an audio signal from the broadcast receiving and playing part 100' is outputted to the output control part 900 (S1833). At this time, "the broadcast receiving and playing part 100'" is stored as output source information. Subsequently, a reference value calculation request for the "program C" outputted by the broadcast receiving and playing part 100' is outputted to the reference value calculation part (S1834).

Here, note that in cases where the view time is longer than zero and it is shorter than "Tl", there is a high possibility that the viewing of the "program B" is due to zapping. Therefore, in such a case, a reference value reset request for resetting the reference value for the broadcast program outputted by the broadcast receiving and playing part 100', i.e., the reference value calculated during the viewing of the "program B", is outputted to the reference value calculation part (S1826).

Next, reference will be made to the operation of the tuning control part 300 at the time when the operation shown in (f) of FIG. 13 is carried out. Here, it is assumed that the view time "Tve3–Tve2" of the "program C" is shorter than the view time "Tve2–Tve1" of the "program B".

Upon reception of a tuning request for channel "Ch. P" from the user interface part 200, the tuning control part 300 acquires a video recording and playback state from the video recording and playback control part 400 (S1801).

Then, it is checked from the acquired video recording and playback state whether a broadcast program outputted from the broadcast receiving and playing part 100 or the broadcast receiving and playing part 100' is being currently played while at the same time being recorded (S1802, S1803). At time point "Tve3", the "program B" outputted by the broadcast receiving and playing part 100' is being recorded, but playback thereof is not being performed (S1802: NO, and S1803: NO), so the control flow advances to S1804.

In S1804, it is checked from the video recording and playing state and output source information whether the broadcast program outputted by the broadcast receiving and playing part 100 is currently being viewed. At time point "Tve3", the "program C" outputted by the broadcast receiving and playing part 100 is being viewed (S1804:YES), so the control flow advances to S1805.

In S1805, the view time "Tve3−Tve2" of the broadcast program outputted by the broadcast receiving and playing part 100 is calculated from the video recording and playing state, the output source information, the tuning time point, the current time "Tve3", and the program information.

Subsequently, it is checked from the video recording and playing state whether the broadcast program outputted by the broadcast receiving and playing part 100' is being currently recorded (S1806). At this time point, the "program B" outputted by the broadcast receiving and playing part 100' is being recorded (S1806:YES), so the control flow advances to S1815.

In S1815, it is checked whether the tuning request is a tuning request to the channel (second channel) to which the broadcast receiving and playing part 100' is tuning in. Here, the tuning request is a tuning request to the channel "Ch. P", but not a tuning request to the channel "Ch. Z" to which the broadcast receiving and playing part 100 is tuning in (S1815: NO), so the control flow advances to S1816.

In S1816, a reference value calculation time with respect to the "program B" outputted by the broadcast receiving and playing part 100' is acquired from the reference value calculation part. Here, the reference value calculation time becomes a period of time for which the user viewed the "program B", i.e., "Tve2−Tve1".

Subsequently, the reference value calculation time thus acquired is compared with the view time calculated in S1805 (S1817). Here, "Tve3−Tve2" is shorter than "Tve2−Tve1" (S1817: NO), so the control flow advances to S1818.

In S1818, a tuning channel "Ch. P" is outputted to the broadcast receiving and playing part 100. At this time, the time point "Tve3" is stored as a tuning time point together with the tuning channel "Ch. P".

Then, an output switch request for outputting a video signal and an audio signal from the broadcast receiving and playing part 100 is outputted to the output control part 900 (S1819). At this time, the "broadcast receiving and playing part 100" is stored as output source information.

Subsequently, a reference value calculation request for the "program D" outputted by the broadcast receiving and playing part 100 is outputted to the reference value calculation part (S1820).

Then, it is checked whether the tuning channel has been outputted to that broadcast receiving and playing part which is being used for video recording (S1813). Here, the tuning channel is outputted to the broadcast receiving and playing part 100 that is not performing recording, which corresponds to "NO" in S1813, and the processing is ended.

Note that in cases where the channel "Ch. Y" to which the broadcast receiving and playing part 100' is tuning in is selected (S1815: YES), the control flow advances to S1808.

In addition, in cases where the view time calculated in S1805 is equal to or larger than the reference value calculation time (S1817: YES), the control flow advances to S1807.

Thus, in the tuning control part 300, a reference value is calculated only for a broadcast program which the user viewed for a long period of time. In addition, only a broadcast program which the user viewed for a long period of time is recorded after an interruption of viewing. Here, note that the tuning control part 300 is not limited in operation to the above-mentioned configuration, but it may be configured such that whether tuning (or channel selection) can be made is checked with the user before a tuning operation is carried out, or it may also be configured such that the reference value and the rate of climax of a broadcast program which was viewed later than others are preferentially calculated.

Hereinafter, the operation of the video recording and playback control part 400 at the time of receiving a playback request from the user interface part 200 will be described. FIG. 21 is a flow chart showing the operation of the video recording and playback control part 400 at the time of receiving a playback request from the user interface part 200. Here, note that in this figure, a value "Tl" to be compared with the view time is a threshold for determining whether the tuning operation of the user switches channels frequently, i.e., whether the switching of channels is done due to zapping, similar to FIG. 14. Although in this example, it is assumed that the threshold is beforehand set in the video recording and playing apparatus 1, such a threshold may be able to be set and changed by the user.

Reference will be made to the operation of the video recording and playback control part 400 at the time when the operation shown in (c) of FIG. 13 is carried out. Here, it is assumed that the length of time from time point "Tve1" to time point "Trs1" is longer than "Tl."

Upon reception of a playback request for the "program A" from the user interface part 200, the video recording and playback control part 400 outputs a recorded program output request for the "program A" according to the playback request to the broadcast program recording part 600 (S1901).

Then, an output switch request for outputting a video signal and an audio signal from the broadcast receiving and playing part 600 is outputted to the output control part 900 (S1902).

Then, output source information and the view time of the broadcast program concerned are acquired from the tuning control part 300 (S1903). Here, the output source information is "the broadcast receiving and playing part 100'", and the view time is "Trs1−Tve1".

Subsequently, the view time thus acquired is compared with "Tl" (S1904). Here, the view time "Trs1−Tve1" is equal to or larger than "Tl", so a reference value calculation end request for the broadcast program corresponding to the output source information acquired in S1903 is outputted to the reference value calculation part (S1906). Herein, a reference value calculation end request for the "program B" outputted by the broadcast receiving and playing part 100' is outputted.

Then, a recording start request for the broadcast program corresponding to the output source information acquired in S1903 is outputted to the broadcast program recording part 600 (S1907). Herein, a recording start request for the "program B" outputted by the broadcast receiving and playing part 100' is outputted.

Thereafter, a climax rate calculation request for the broadcast program corresponding to the output source information acquired in S1903 is outputted to the climax rate calculation part 700 (S1908), and the processing is ended. Herein, a climax rate calculation request for the "program B" outputted by the broadcast receiving and playing part 100' is outputted, and the processing is ended.

Here, note that in cases where the view time is 0, the processing is ended after S1904. In cases where the view time is longer than zero and it is shorter than "Tl", there is a high possibility that the viewing of the "program B" is due to zapping. Therefore, in such a case, a reference value reset request for resetting the reference value calculated during the viewing of the broadcast program corresponding to the above-mentioned output source information is outputted to the reference value calculation part (S1905). Specifically, a reference value reset request for resetting the reference value for the broadcast program outputted by the broadcast receiving and playing part 100', i.e., the reference value calculated during the viewing of the "program B", is outputted.

Figure 22A:
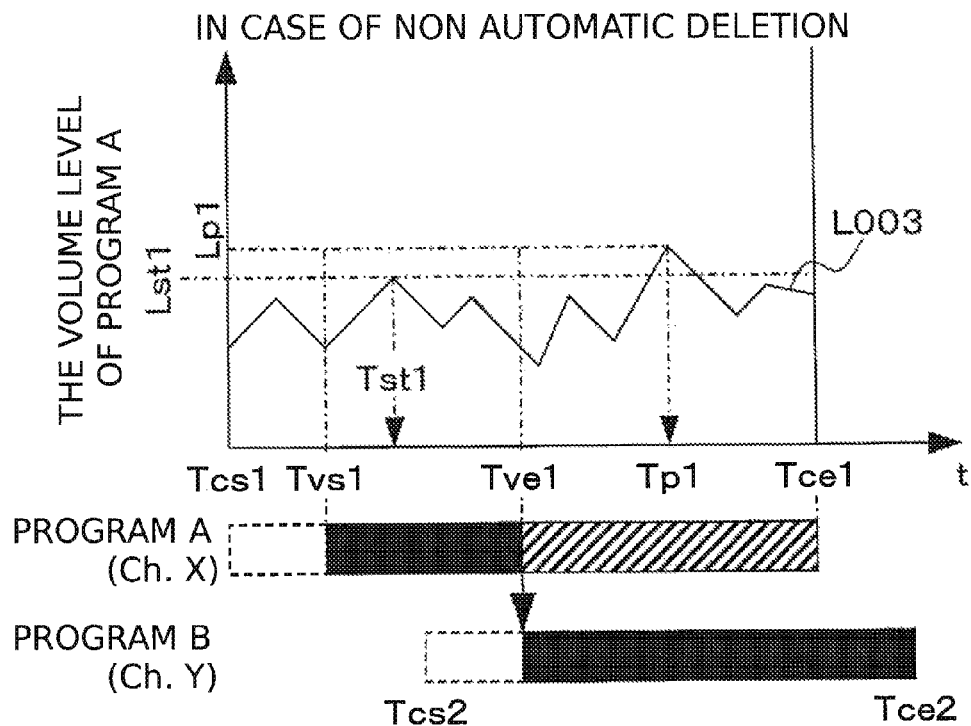
FIG. 22A and FIG. 22B show examples of the change of the volume level from the start of broadcasting a program to the end thereof, wherein the axis of ordinate represents time and the axis of abscissa represents the volume level.
Figure 22B:
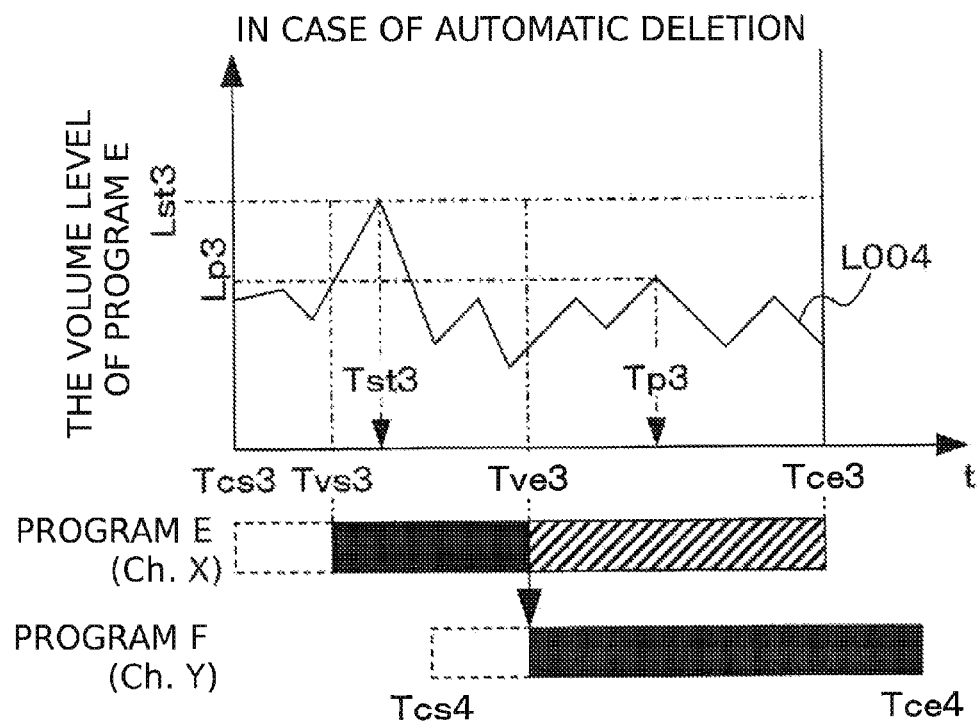

FIG. 22A and FIG. 22B respectively show examples of the change of the volume level from the start of broadcasting the "program A" and the "program E" to the end thereof, wherein the axis of ordinate represents time and the axis of abscissa represents the volume level. In addition, the view period and the video recording period are also shown together. In these figures, a portion filled with black denotes the view period of the broadcast program, and a diagonally shaded area denotes the recording period of the broadcast program, and a portion surrounded by a broken line denotes a period in which neither viewing nor recording is carried out.

FIG. 22A shows an example in which after viewing the "program A" from time point "Tvs1" to time point "Tve1", the user viewed the "program B" until time point "Tce2" by switching from channel "Ch. X" to channel "Ch. Y". Here, it is assumed that the length of time from time point "Tvs1" to time point "Tve1" is longer than "Tl."

In the example of FIG. 22A, the volume level of the "program A" changes as shown by L003. The maximum value of the volume level in the view period of the "program A" is a value "Lst1" at time point "Tst1", and the maximum value of the volume level of the "program A" after an interruption of viewing (during the video recording period) is a value "Lp1" at time point "Tp1". The value "Lp1" is larger than the value "Lst1".

FIG. 22B shows an example in which after viewing the "program E" from time point "Tvs3" to time point "Tve3", the user viewed the "program F" until time point "Tce4" by switching from channel "Ch. X" to channel "Ch. Y". Here, it is assumed that the length of time from time point "Tvs3" to time point "Tve3" is longer than "Tl."

In the example of FIG. 22B, the volume level of the "program E" changes as shown by L004. The maximum value of the volume level in the view period of the "program E" is a value "Lst3" at time point "Tst3", and the maximum value of the volume level of the "program E" after an interruption of viewing (during the video recording period) is a value "Lp3" at time point "Tp3". The value "Lp3" is smaller than the value "Lst3".

Figure 23:
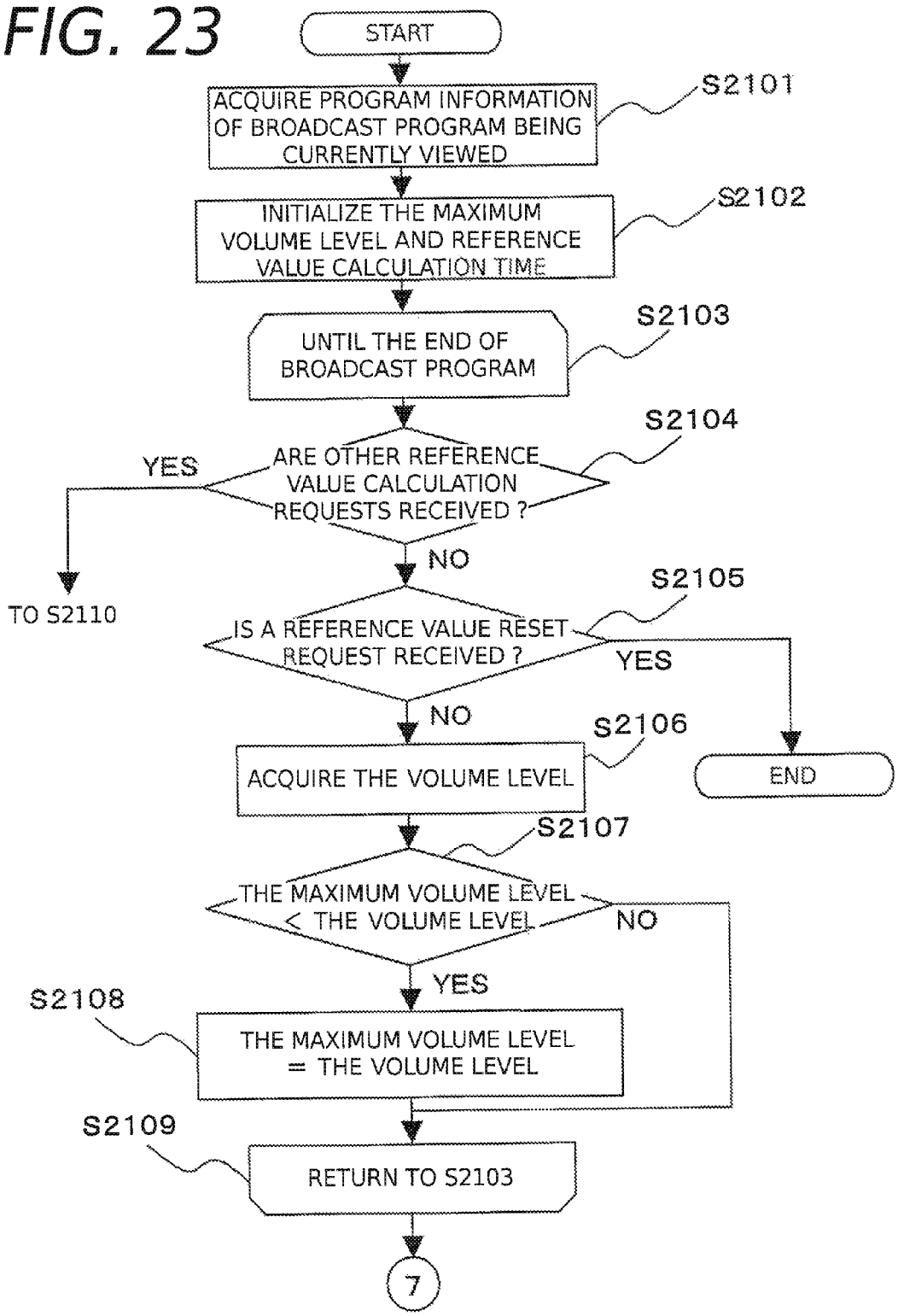
FIG. 23 is a flow chart showing an operation of a reference value calculation part according to the third example at the time of receiving a reference value calculation request.
Figure 24:
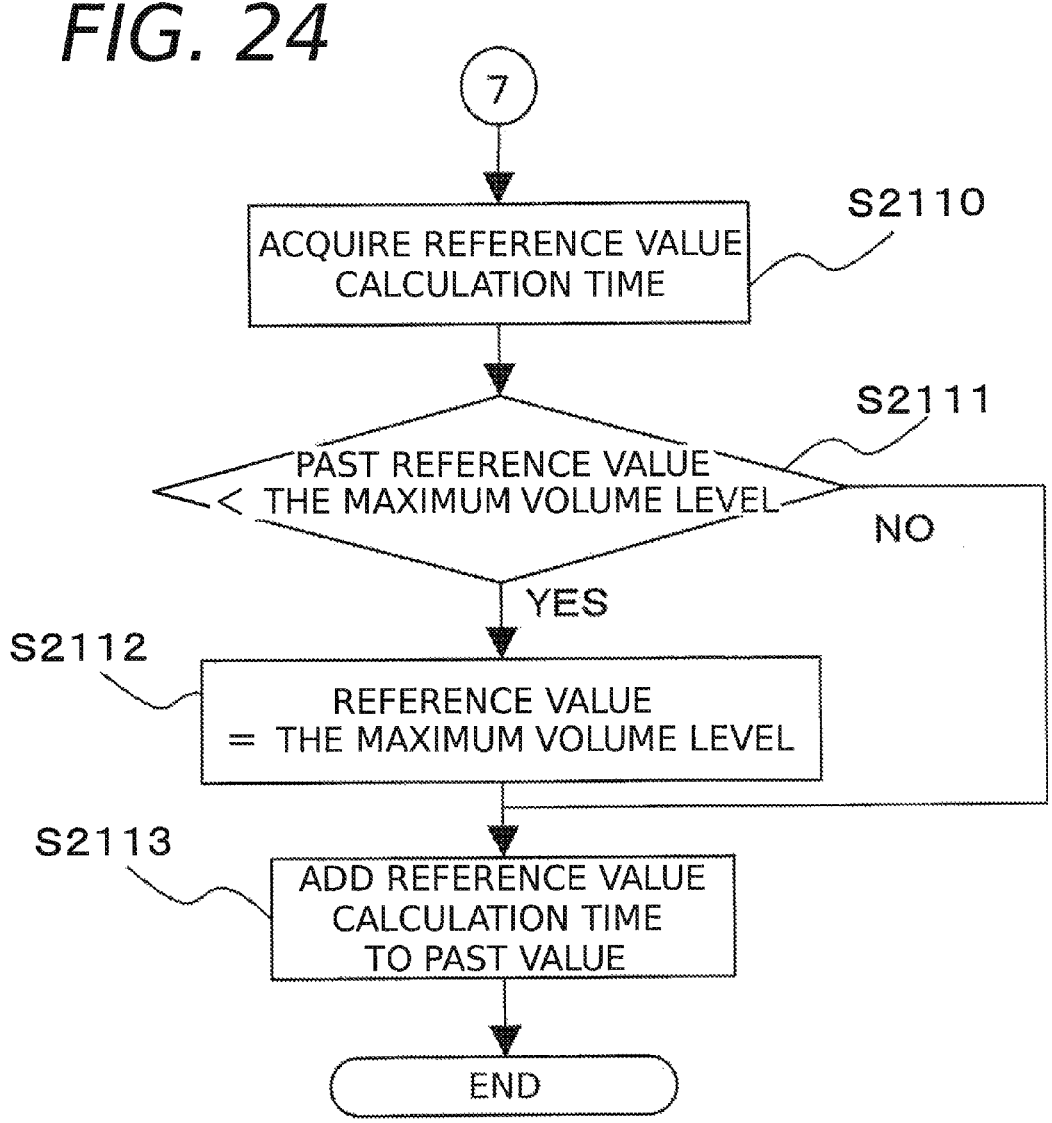
FIG. 24 is a flow chart showing an operation of the reference value calculation part according to the third example at the time of receiving the reference value calculation request.

FIGS. 23 and 24 are flow charts showing the operation of the reference value calculation part at the time of receiving a reference value calculation request from the tuning control part 300. Hereinafter, reference value calculation processing will be described in the case of FIG. 22A.

Upon reception of a reference value calculation request from the tuning control part 300, the reference value calculation part acquires the program information of a broadcast program (broadcast program being currently viewed) which is a target of reference value calculation from the program information management part 500 based on the reference value calculation request and a time point at which the request was received (S2101). In the example of FIG. 22A, the tuning channel is "Ch. X" and the time point at which the request was received is "Tvs1", so program information of T001 in FIG. 4 is acquired.

Subsequently, the maximum value of the volume level (the maximum volume level) and the processing time of reference value calculation (reference value calculation time) are initialized (S2102). Specifically, the maximum volume level and the reference value calculation time are both set to 0. Thereafter, processings from S2104 to S2109 are repeated until the end of the broadcast program concerned (S2103).

First, it is checked whether other reference value calculation requests have been received from the tuning control part 300 (S2104). In the example of FIG. 22A, until time point "Tve1", tuning has not been performed and other reference value calculation requests have not been received (S2104: NO), so the control flow advances to S2105.

In S2105, it is checked whether a reference value reset request is received from the tuning control part 300. Here, the view time is longer than "Tl", that is, a reference value reset request is not received (S2105: NO), so the control flow advances to S2106.

In S2106, the volume level is acquired from an audio signal which is outputted by the broadcast receiving and playing part 100 or the broadcast receiving and playing part 100', in accordance with the reference value calculation request (S2106). Here, in order to calculate the reference value of a broadcast program outputted from the broadcast receiving and playing part 100, the volume level is acquired from the audio signal outputted by the broadcast receiving and playing part 100.

Subsequently, it is determined whether the volume level thus acquired is larger than the maximum volume level (S2107). In cases where the acquired volume level is larger than the maximum volume level (S2107: YES), the acquired volume level is set as the maximum volume level (S2108).

Then, a return is made to S2103, where the above-mentioned processing is repeated (S2109). As a result, the maximum value of the volume level during performing the reference value calculation processing is acquired. In the example of FIG. 22A, a period of time from time point "Tvs1" to time point "Tst1" corresponds to "YES" in S2107, and a period of time thereafter corresponds to "NO" in S2107. Therefore, the maximum volume level becomes the volume level "Lst1" at time point "Tst1". Then, at time point "Tve1", the tuning control part 300 outputs another reference value calculation request, which corresponds to "YES" in S2104, and hence the repeated processings from S2103 to S2109 are exited, and the control flow advances to S2110.

In S2110, a reference value calculation time is acquired.

Subsequently, it is determined whether the acquired maximum volume level is larger than the reference value stored for the broadcast program concerned (the reference value calculated for the broadcast program concerned in the past) (S2111). In cases where the acquired maximum volume level is larger than the reference value (S2111: YES), the maximum volume level is stored as the reference value for the broadcast program concerned (S2112).

Then, the reference value calculation time acquired in S2110 is added to a reference value calculation time for the broadcast program concerned stored in the past (S2113). In the example of FIG. 22A, a reference value for the "program A" has not been calculated in the past (no reference value calculation time has been stored in the past), so "Lst1" is stored as a reference value, and "Tve1−Tvs1" is stored as a reference value calculation time.

On the other hand, in the case of FIG. 22B, in cases where reference value detection processing is performed, a reference value for the "program E" becomes "Lst3", and a reference value calculation time becomes "Tve3−Tvs3".

Here, note that in cases where a reference value reset request is received from the tuning control part 300 (S2105: YES), the processing is ended without updating the reference value.

Thus, in this example, even in cases where the user intermittently views a certain broadcast program while changing channels, a reference value for the broadcast program is calculated based on the audio signal thereof in all the view periods of the broadcast program. In addition, in cases where the intermittent viewing of the broadcast program concerned is due to zapping, it is considered that the user is not able to grasp the content of the broadcast program concerned, and hence such a view period is excluded from the calculation of the reference value.

Figure 25:
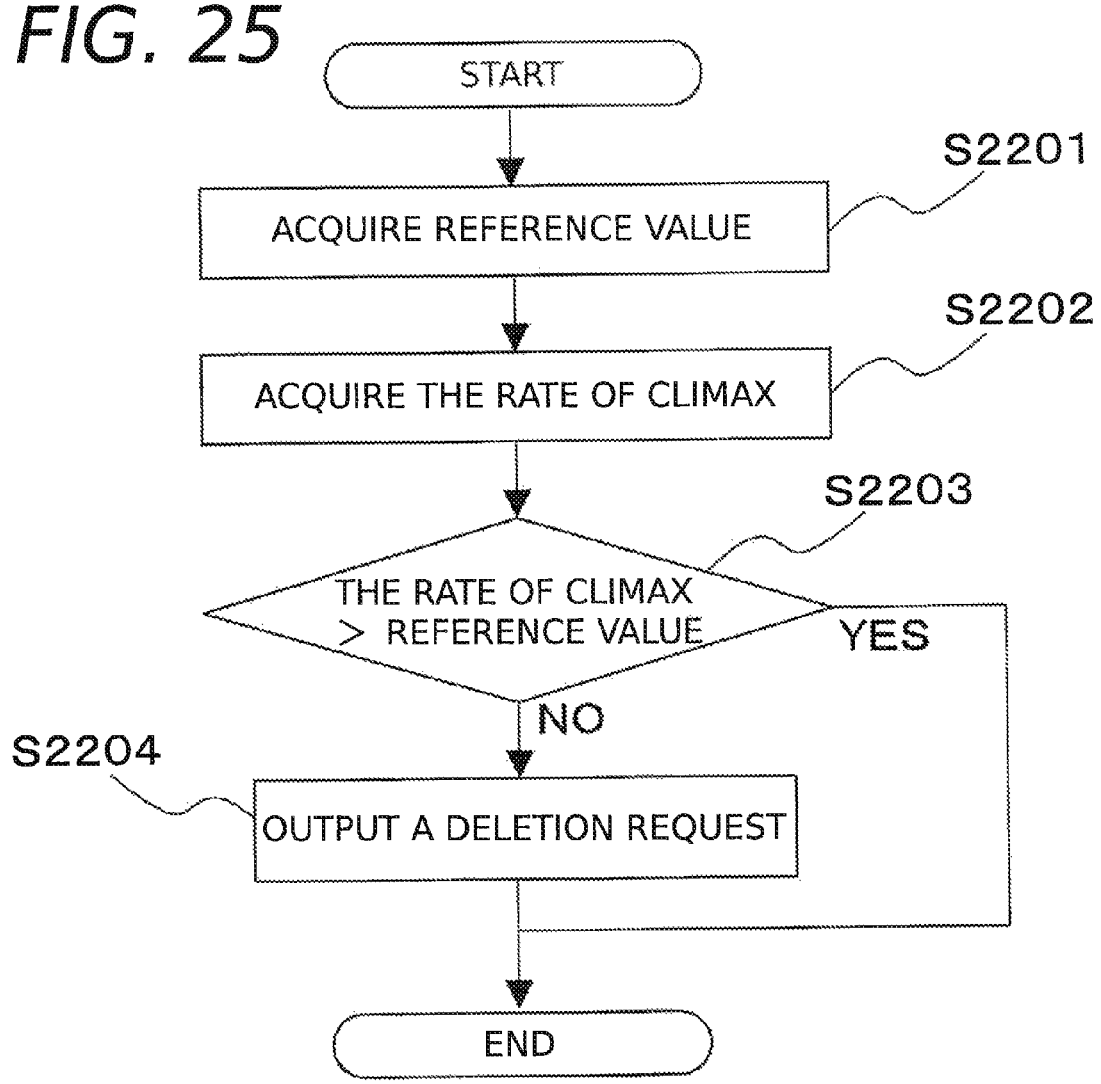
FIG. 25 is a flow chart showing an operation of an automatic deletion determination part according to the third example at the time of receiving an automatic deletion determination request.

FIG. 25 is a flow chart showing the operation of the automatic deletion determination part 800 at the time of receiving an automatic deletion determination request from the video recording and playback control part 400. Hereinafter, automatic deletion determination processing will be described in the cases of FIG. 22A and FIG. 22B.

Upon reception of an automatic deletion determination request from the video recording and playback control part 400, the automatic deletion determination part 800 acquires a reference value for a target broadcast program to be processed from the reference value calculation part (S2201).

Subsequently, the rate of climax of the target broadcast program from the climax rate calculation part 700 is acquired (S2202), and it is checked whether the rate of climax thus acquired is larger than the reference value (S2203). In the case of FIG. 22A, the reference value is "Lst1" and the rate of climax is "Lp1", so the rate of climax is larger than the reference value (S2203: YES), as a result of which the automatic deletion determination processing is ended as it is. On the other hand, in the case of FIG. 22B, the reference value is "Lst3" and the rate of climax is "Lp3", so the rate of climax is equal to or less than the reference value (S2203: NO), as a result of which a deletion request for the "program E" is outputted to the broadcast program recording part 600 (S2204).

Thus, in this example, after the user interrupts viewing of a broadcast program, video recording of the broadcast program is automatically started. Then, in cases where the broadcast program being recorded was less exciting or lower in climax than during viewing thereof, the broadcast program is made a target of deletion. By so doing, it is possible to eliminate the troublesomeness of manually deleting the broadcast program which did not show such a rate of climax as expected by the user. In addition, since among a plurality of broadcast programs automatically recorded, those which showed a climax are saved, it is possible to decrease the possibility that the user overlooks the broadcast programs having showed a climax.

Here, note that in this example, a broadcast program in which a maximum value of the volume level in a video recording period is equal to or less than that in a reference value calculation period is made a target of deletion, but a broadcast program in which an average value of the volume level in a video recording period is equal to or less than that in a reference value calculation period may be made a target of deletion. Also, a broadcast program in which a maximum value or an average value of a rating in a video recording period is equal to or less than that in a reference value calculation period may be made a target of deletion. In addition, although in this example, the initial value of the reference value is set to 0, the user may set the initial value beforehand.

Moreover, in this example, a reference value calculation period is made a period of time from when the user starts viewing a broadcast program until when the user interrupts the viewing of the broadcast program, but a period having a specified length ending at a time point at which the user interrupted viewing of a broadcast program be set as a reference value calculation period.

In addition, in this example, a reference value calculation request and/or a climax rate calculation request are outputted at timing at which the user has done tuning, but the timing at which a reference value calculation request and/or a climax rate calculation request are outputted is not limited to this. For example, in cases where the viewing of a broadcast program is reserved in the apparatus, a reference value calculation request and/or a climax rate calculation request may be outputted at timing at which the reserved broadcast program is tuned in automatically. Also, at the time when a power supply is turned off, a climax rate calculation request may be outputted.

As stated above, according to a video recording and playing apparatus of this embodiment, a broadcast program being currently recorded can be deleted in an automatic manner. Further, a broadcast program having showed climax or exciting can be made hard to be deleted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-030014, filed on Feb. 12, 2009, which is hereby incorporated by reference herein in its entirety.

What is claimed is:

1. A recording apparatus comprising:
   a receiving unit that receives video signals and audio signals of broadcast programs;
   a recording unit that records on a recording medium the video signals and the audio signals of the broadcast programs received by the receiving unit;
   a detection unit that (a) detects a level of the audio signal received by the receiving unit during recording of the video signal and the audio signal by the recording unit and (b) outputs information of the level of the audio signal, wherein the recording unit records the information, which is outputted from the detection unit, of the level of the audio signal, on the recording medium with the video signal and the audio signal of the broadcast program;
   a discrimination unit that discriminates whether each of a plurality of broadcast programs recorded on the recording medium has been viewed by a user; and
   a deletion unit that (a) determines, as a target of deletion, a broadcast program about which it is discriminated that the level of the audio signal does not reach a threshold and which the discrimination unit discriminates as having not been viewed by the user from the plurality of broadcast programs recorded on the recording medium, in accordance with a discrimination result of the discrimination unit and the information of the level of the audio signal of each of the plurality of broadcast programs recorded on the recording medium and (b) deletes the broadcast program determined as the target of deletion from the recording medium,
   wherein the deletion unit does not determine, as the target of deletion, a broadcast program which is discriminated by the discrimination unit as being a broadcast program that has been viewed by the user.

2. A control method for a recording apparatus, the method comprising:
   a receiving step of receiving video signals and audio signals of broadcast programs;
   a recording step of recording on a recording medium the video signals and the audio signals of the broadcast programs received by the receiving step;
   a detection step of (a) detecting a level of the audio signal received by the receiving step during recording of the video signal and the audio signal in the recording step and (b) outputting information of the level of the audio signal, wherein in the recording step, the information, which is outputted in the detection step, of the level of the audio signal is recorded on the recording medium with the video signal and the audio signal of the broadcast program;

a discrimination step of discriminating whether each of a plurality of broadcast programs recorded on the recording medium has been viewed by a user; and a deletion step of (a) determining as a target of deletion, a broadcast program about which it is discriminated that the level of the audio signal does not reach a threshold and which the discrimination step discriminates as having not been viewed by the user from the plurality of broadcast programs recorded on the recording medium, in accordance with a discrimination result of the discrimination step and the information of the level of the audio signal of each of the plurality of broadcast programs recorded on the recording medium and (b) deleting the broadcast program determined as the target of deletion from the recording medium, wherein in the deletion step, a broadcast program which is discriminated in the discrimination step as being a broadcast program that has been viewed by the user is not determined as the target of deletion.

3. The apparatus according to claim 1, further comprising a control unit that starts operating the detection unit in response to a start of recording the video signal and the audio signal by the recording unit, and stops operating the detection unit in response to a stop of recording the video signal and the audio signal.

* * * * *